United States Patent
Mooring et al.

(10) Patent No.: US 9,390,267 B2
(45) Date of Patent: Jul. 12, 2016

(54) SYSTEMS AND METHODS INVOLVING FEATURES OF HARDWARE VIRTUALIZATION, HYPERVISOR, PAGES OF INTEREST, AND/OR OTHER FEATURES

(71) Applicant: Lynx Software Technologies, Inc., San Jose, CA (US)

(72) Inventors: Edward T. Mooring, Santa Clara, CA (US); Phillip Yankovsky, Campbell, CA (US)

(73) Assignee: Lynx Software Technologies, Inc., San Jose, CA (US)

( * ) Notice: Subject to any disclaimer, the term of this patent is extended or adjusted under 35 U.S.C. 154(b) by 0 days.

(21) Appl. No.: 14/714,125

(22) Filed: May 15, 2015

(65) Prior Publication Data

US 2015/0371042 A1      Dec. 24, 2015

Related U.S. Application Data

(60) Provisional application No. 61/993,290, filed on May 15, 2014.

(51) Int. Cl.
G06F 21/00 (2013.01)
G06F 21/56 (2013.01)
(Continued)

(52) U.S. Cl.
CPC .............. G06F 21/563 (2013.01); G06F 9/455 (2013.01); G06F 9/45545 (2013.01); G06F 9/45558 (2013.01); G06F 9/50 (2013.01);
(Continued)

(58) Field of Classification Search
CPC ......... G06F 21/50; G06F 21/41; G06F 21/52; G06F 21/53; G06F 21/57; G06F 21/577
See application file for complete search history.

(56) References Cited

U.S. PATENT DOCUMENTS 7,992,144 B1   8/2011   Hendel
8,056,076 B1   11/2011  Hutchins et al.
(Continued)

FOREIGN PATENT DOCUMENTS

JP    2010-049627     3/2010
WO    WO 2010/021631  2/2010
(Continued)

OTHER PUBLICATIONS

International Search Report and Written Opinion for related International application PCT/US15/31236 dated Aug. 14, 2015, 9 pgs.
(Continued)

*Primary Examiner* — Edward Zee
(74) *Attorney, Agent, or Firm* — Knobbe, Martens, Olson & Bear, LLP

(57) ABSTRACT

Systems, methods, computer readable media and articles of manufacture consistent with innovations herein are directed to computer virtualization, computer security and/or memory access. According to some illustrative implementations, innovations herein may utilize and/or involve a separation kernel hypervisor which may include the use of a guest operating system virtual machine protection domain, a virtualization assistance layer, and/or a detection mechanism (which may be proximate in temporal and/or spatial locality to malicious code, but isolated from it), inter alia, for detection and/or notification of, and action by a monitoring guest upon access by a monitored guest to predetermined physical memory locations.

90 Claims, 15 Drawing Sheets

(51) Int. Cl.
| | |
|---|---|
| *G06F 21/57* | (2013.01) |
| *G06F 21/50* | (2013.01) |
| *G06F 9/455* | (2006.01) |
| *G06F 9/50* | (2006.01) |
| *G06F 11/36* | (2006.01) |

(52) U.S. Cl.
CPC ........... *G06F 11/3644* (2013.01); *G06F 21/50* (2013.01); *G06F 21/57* (2013.01); *G06F 2009/45583* (2013.01); *G06F 2009/45587* (2013.01)

(56) References Cited

U.S. PATENT DOCUMENTS

| | | | |
|---|---|---|---|
| 8,141,163 | B2 | 3/2012 | Pike |
| 8,352,941 | B1 | 1/2013 | Protopopov et al. |
| 8,490,086 | B1 | 7/2013 | Cook |
| 8,539,584 | B2 | 9/2013 | Ramalingam |
| 8,549,643 | B1 | 10/2013 | Shou |
| 8,584,211 | B1 | 11/2013 | Vetter et al. |
| 2002/0166059 | A1 | 11/2002 | Rickey et al. |
| 2003/0093682 | A1 | 5/2003 | Carmona et al. |
| 2005/0216759 | A1 | 9/2005 | Rothman et al. |
| 2006/0184937 | A1 | 8/2006 | Abels |
| 2007/0050764 | A1 | 3/2007 | Traut |
| 2007/0136506 | A1 | 6/2007 | Traut |
| 2008/0016570 | A1 | 1/2008 | Capalik |
| 2008/0320594 | A1 | 12/2008 | Jiang |
| 2009/0158432 | A1 | 6/2009 | Zheng et al. |
| 2009/0204964 | A1 | 8/2009 | Foley et al. |
| 2009/0254990 | A1* | 10/2009 | McGee .................. G06F 21/51 726/22 |
| 2009/0328225 | A1 | 12/2009 | Chambers et al. |
| 2010/0027552 | A1 | 2/2010 | Hill |
| 2010/0146267 | A1 | 6/2010 | Konetski |
| 2010/0328064 | A1 | 12/2010 | Rogel |
| 2011/0145916 | A1 | 6/2011 | McKenzie et al. |
| 2011/0167422 | A1 | 7/2011 | Eom et al. |
| 2011/0185063 | A1 | 7/2011 | Head et al. |
| 2011/0225458 | A1 | 9/2011 | Zuo et al. |
| 2011/0225655 | A1 | 9/2011 | Niemela et al. |
| 2012/0035681 | A1 | 2/2012 | Maximilien |
| 2012/0185913 | A1 | 7/2012 | Martinez et al. |
| 2013/0024940 | A1 | 1/2013 | Hutchins et al. |
| 2013/0097356 | A1 | 4/2013 | Dang et al. |
| 2013/0312099 | A1 | 11/2013 | Edwards et al. |
| 2013/0347131 | A1 | 12/2013 | Mooring et al. |

FOREIGN PATENT DOCUMENTS

| | | |
|---|---|---|
| WO | WO 2012/177464 | 12/2012 |
| WO | WO 2016/004263 | 1/2016 |

OTHER PUBLICATIONS

Dam et al., "Formal Verification of Information Flow Security for a Simple ARM-based Separation Kernel ," ACM, Nov. 2013, pp. 223-234 (12 pgs.).

Day et al., "Secure Virtualization combines Traditional Desktop Oss and Embedded RTOSs in Military Embedded Systems", May 2010, 10 pgs. http://www.lynx.com/whitepaper/secure-virtualization-combines-traditional-desktop-oss-and-embedded-rtoss-in-military-embedded-systems/.

Day et al., "Virtualization: Keeping Embedded software Safe and Secure in an Unsafe World Secure Virtualization for Real-time, Linux and Windows Systems," EE Times, Jun. 2010, pp. 1-3 (3 pgs.) http://www.lynuxworks.com/virtualization/keeping-embedded-software-secure.php.

Day, Robert, "Hardware Virtualization Puts on a New Spin on Secure Systems", COTS Journal, http://www.lynuxworks.com/virtualization/virtualization-hardware.php, Oct. 2010, 6 pgs.

Delong et al. "Separation Kernel for a Secure Real-time Operating System," Jun. 2010, 5 pgs. http://web.archive.org/web/20100630223040/http://lynuxworks.com/products/whitepapers/separation-kenel.php.

Embedded computing design, "Advances in Virtualization Aid Information Assurance," Jan. 2008, pp. 1-8 (8 pgs.), http://embedded-computing.com/article-id/?2571.

Hoffman et al., "User Mode Versus Privileged Mode Processor Usage," Sep. 2010, pp. 1-2 (2 pgs.), http://blogs.technet.com/b/perfguide/archive/2010/09/28/user-mode-versus-privileged-mode-processor-usage-aspx.

International Search Report and Written Opinion for PCT/US2015/038918 dated Jan. 7, 2016, 13 pgs.

Iqbal et al., "An Overview of Microkemel, Hypervisor and Microvisor Virtualization Approaches for Embedded Systems," Dec. 2010, 15 pgs., http://proj.eit.lth.se/fileadmin/eit/project/142/virtApproaches.pdf.

International Preliminary Report on Patentability dated Dec. 31, 2014 (11 pgs) and International Search Report and Written Opinion dated Feb. 27, 2014 (14 pgs) in related PCT application No. PCT/US2013/048014, Invitation to Pay Additional Fees in related PCT/US2013/48014, dated Jan. 3, 2014, (2 pgs.) 27 pgs. total.

International Search Report and Written Opinion for PCT/US15/31236 dated Aug. 14, 2015, 8 pgs.

International Search Report and Written Opinion for PCT/US15/31257 dated Aug. 17, 2015, 8 pgs.

Lynuxworks, "Secure Client Virtualization Based on Military-grade Technology," May 2011, pp. 1-8 (8pgs), http://web.archive.org/web/20110310051907/http://lynuxworks.com/virtualization/secure-client-virtualization/php.

Prosecution of U.S. Appl. No. 14/714,241, now U.S. Pat. No. 9,203,855, including Office Action dated Jul. 30, 2015 (8 pgs.); Response to Office Action filed Sep. 3, 2015 (11 pgs), and Notice of Allowance dated Oct. 27, 2015 (9 pgs.); 28 pages total.

Prosecution of U.S. Appl. No. 14/714,233, now U.S. Pat. No. 9,213,840, including Office action dated Aug. 31, 2015 (7 pgs): Response to Office Action filed Sep. 28, 2015 (10 pgs), and Notice of Allowance date Nov. 2, 2015 (12 pgs.); 29 pgs total.

Prosecution of EPO application No. EP13809599.7, including International Preliminary Report on Patentability and Search Report; dated Dec. 1, 2015 (16 pgs), Communication dated Feb. 13, 2015 (3 pgs) and Amendment dated Aug. 24, 2015 (29 pgs); 48 pgs total.

Yoon et al., "An Intelligence Virtualization Rule Based on Multilayer to Support social-Media Cloud Service", 2011, First ACIS/JNU International conference on computers; Networks, Systems, and Industrial Engineering, pp. 210-215; 6 pgs.

* cited by examiner

SYSTEMS AND METHODS INVOLVING FEATURES OF HARDWARE VIRTUALIZATION, HYPERVISOR, PAGES OF INTEREST, AND/OR OTHER FEATURES

CROSS-REFERENCE TO RELATED APPLICATION INFORMATION

This application claims benefit/priority of U.S. provisional patent application No. 61/993,290, filed May 15, 2014, which is incorporated herein by reference in entirety.

BACKGROUND

1. Field

Innovations herein pertain to computer software and hardware, computer virtualization, computer security and/or data isolation, and/or the use of a separation kernel hypervisor (and/or hypervisor), such as to detect and/or process information, including notification(s) and/or other processing regarding memory access by guest software and which may include or involve guest operating system(s).

2. Description of Related Information

In computer systems with hypervisors supporting a guest operating system, there exist some means to monitor the guest operating system for malicious or errant activity.

In a virtualized environment, running under control of a hypervisor, a suitably authorized guest may be allowed to monitor the activities of another guest. Among the reasons for such monitoring are debugging and security. However, previous approaches may include various drawbacks, such as allowing guests to poll the memory and other information within the monitored guest.

However, due to the constantly evolving nature of malicious code, such systems face numerous limitations in their ability to detect and defeat malicious code. One major limitation is the inability of a hypervisor to defend itself against malicious code; e.g., the particular hypervisor may be subverted by malicious code and/or may allow malicious code in a guest operating system to proliferate between a plurality of guest operating systems in the system.

To solve that issue, the motivation and use of a Separation Kernel Hypervisor is introduced in environments with malicious code. The Separation Kernel Hypervisor, unlike a hypervisor, does not merely support a plurality of Virtual Machines (VMs), but supports more secure, more isolated mechanisms, including systems and mechanisms to monitor and defeat malicious code, where such mechanisms are isolated from the malicious code but are also have high temporal and spatial locality to the malicious code. For example, they are proximate to the malicious code, but incorruptible and unaffected by the malicious code.

Furthermore the Separation Kernel Hypervisor is designed and constructed from the ground-up, with security and isolation in mind, in order to provide security and certain isolation between a plurality of software entities (and their associated/assigned resources, e.g., devices, memory, etc.); by mechanisms which may include Guest Operating System Virtual Machine Protection Domains (secure entities established and maintained by a Separation Kernel Hypervisor to provide isolation in time and space between such entities, and subsets therein, which may include guest operating systems, virtualization assistance layers, and detection mechanisms); where such software entities (and their associated assigned resources, e.g., devices, memory, etc., are themselves isolated and protected from each other by the Separation Kernel Hypervisor, and/or its use of hardware platform virtualization mechanisms.

Additionally, where some hypervisors may provide mechanisms to communicate between the hypervisor and antivirus software, or monitoring agent, executing within a guest operating system (for purposes of attempting to monitor malicious code), the hypervisor is not able to prevent corruption of the monitoring agent where the agent is within the same guest operating system as the malicious code; or the guest operating system (or any subset thereof, possibly including the antivirus software, and/or monitoring agent) is corrupted and/or subverted.

With a Separation Kernel Hypervisor, one may use a defense-in-depth technique in order to provide a runtime execution environment whereby software can securely monitor for malicious code without being affected or corrupted by it; while at the same time having close proximity (in time and space) to the malicious code (or code, data, and/or resources under monitoring).

Finally, while some known systems and methods include implementations involving virtualized assistance layers and separation kernel hypervisors to handle various malicious code intrusions, however the present disclosure is directed to innovations for handling and/or intercepting various certain specified attacks, such as those related to pages of interest.

Overview of Some Aspects

Systems, methods, computer readable media and articles of manufacture consistent with innovations herein are directed to computer virtualization, computer security and/or data isolation, and/or the use of a Separation Kernel Hypervisor (and/or hypervisor), such as to detect, process information and/or provide notification regarding physical memory access by guest software and which may include or involve guest operating system(s). Here, for example, certain implementations may include a suitably authorized guest running under control of a hypervisor and involving features of being notified of another guest accessing specified physical memory.

According to some illustrative implementations, innovations herein may utilize and/or involve a separation kernel hypervisor which may include the use of a guest operating system virtual machine protection domain, a virtualization assistance layer, and/or a detection mechanism (which may be proximate in temporal and/or spatial locality to malicious code, but isolated from it), inter alia, for detection and/or notification of physical memory access by guest software. Features of unmapping, re-mapping, and real-time notification of, and action(s) regarding, memory access are provided regarding the monitoring guest upon access by the monitored guest to specific physical memory locations.

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and features of the present innovations and, together with the description, explain aspects of the inventions herein. In the drawings.

DETAILED DESCRIPTION OF ILLUSTRATIVE IMPLEMENTATIONS

Figure 1:
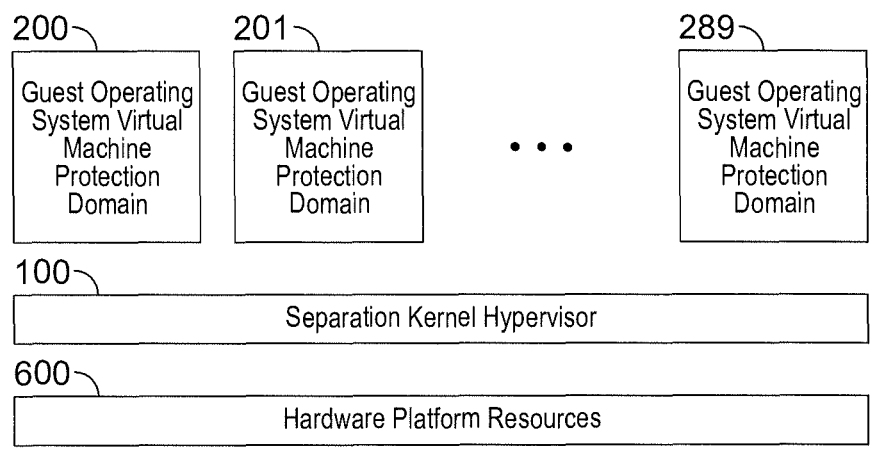
FIG. 1 is a block diagram illustrating an exemplary system and Separation Kernel Hypervisor architecture consistent with certain aspects related to the innovations herein.

Reference will now be made in detail to the inventions herein, examples of which are illustrated in the accompanying drawings. The implementations set forth in the following description do not represent all implementations consistent with the inventions herein. Instead, they are merely some examples consistent with certain aspects related to the present innovations. Wherever possible, the same reference numbers are used throughout the drawings to refer to the same or like parts.

To solve one or more of the drawbacks mentioned above and/or other issues, implementations herein may relate to various detection, monitoring, notification(s) and/or prevention techniques, systems, and mechanisms, as may be used with a separation kernel hypervisor. Among other things, such systems and methods may include and/or involve the use of the monitoring of the entirety, or suitably configured subset thereof of guest operating system resources including virtualized resources, and/or "physical" or "pass-through" resources. Examples include monitoring of the virtual CPUs and its memory access attempts to execute code at specified memory locations such as monitoring pages of interest.

With regard to certain implementations, in order to perform such advanced monitoring in a manner that maintains suitable performance characteristics in a system that may include a separation kernel hypervisor and a guest operating system, mechanisms such as a separation kernel hypervisor, a guest operating system virtual machine protection domain, virtual machine assistance layer, and/or memory access detection mechanisms, may be used to monitor a monitored guest on a corresponding guest operating system.

Systems and methods are disclosed for detecting and/or notifying physical memory access by guest software and which may include or involve guest operating system(s). According to some implementations, for example, a suitably authorized guest running under control of a hypervisor may request that it be notified of another guest accessing specified physical memory. Real-time notification of, and action is provided by the monitoring guest upon access by the monitored guest to specific physical memory locations. Here, monitoring may also be performed in a timely and expeditious fashion, including by virtue of the monitoring context being proximate (in time and space) to the monitored context. Additionally, isolation may be maintained between the monitor and monitored context. Further, such monitoring may be performed by mechanisms providing a wide and comprehensive set of monitoring techniques and resources under monitoring, inter alia, so as to monitor against threats which are multi-lateral and/or multi-dimensional in nature.

According to some implementations, for example, a hypervisor is configured to allow a guest (monitoring guest) to request notifications of access by another guest (monitored guest). The monitoring guest may request that a set of physical pages be monitored, and an action (e.g., pause, disallow, or continue) to be taken on such access. The Virtualization Assistance Layer (VAL) in the monitored guest maps those physical pages as inaccessible. This is distinct from the monitored guest's notion of page mappings. When software in the monitored guest accesses an unmapped page, control goes to the VAL. The VAL then determines that the unmapped page is part of the set to be monitored. The VAL then notifies the monitoring guest of the access. If the action is pause, the monitored guest is paused. If the action is disallow, the monitored guest is injected with an exception, as though the page did not exist. If the action is continue, the monitored guest is allowed to continue operation as though the page had always been mapped in.

According to some implementations, for example, a separation kernel hypervisor ensures the isolation of multiple guest Operating Systems each in its own virtual machine (VM). The separation kernel hypervisor implements a mechanism whereby a suitably authorized guest can send a list of memory locations to be watched to another guest. The separation kernel hypervisor implements a mechanism whereby a suitably authorized guest can send a message to another guest. A virtualization assistance layer (VAL) is provided that runs within the same protection domain as the guest virtual machine but is not directly accessible by the guest. The virtualization assistance layer implements a virtual motherboard containing a virtual CPU and memory. The VAL implements a mechanism to unmap specified pages on demand from another guest. The VAL processes unmapped page exceptions taken by its associated guest virtual machine. The VAL can pause the execution of its associated guest virtual machine, can inject a page-not-found exception into its associated guest virtual machine, and can send a notification of the memory access and associated context information to the requesting guest.

Systems and methods are disclosed for providing secure information monitoring. According to some implementations, for example, such information monitoring may be provided from a context not able to be bypassed, tampered with or by the context under monitoring. Here, monitoring may also be performed in a timely and expeditious fashion, including by virtue of the monitoring context being proximate (in time and space) to the monitored context. Additionally, isolation may be maintained between the monitor and monitored context. Further, such monitoring may be performed by mechanisms providing a wide and comprehensive set of monitoring techniques and resources under monitoring, inter alia, so as to monitor against threats which are multi-lateral and/or multi-dimensional in nature.

In one exemplary implementation, there is provided a method of secure domain isolation, whereby an execution context within a virtual machine may monitor another execution context within that virtual machine or another virtual machine, in a manner maintaining security and isolation between such contexts. Innovations herein also relate to provision of these contexts such that neither/none can necessarily corrupt, affect, and/or detect the other.

Moreover, systems and methods herein may include and/or involve a virtual machine which is augmented to form a more secure virtual representation of the native hardware platform for a particular execution context. And such implementations may also include a virtual representation which is augmented with a wide and deep variety of built-in detection, notification(s) and monitoring mechanisms, wherein secure isolation between the domains or virtual machines is maintained.

In general, aspects of the present innovations may include, relate to, and/or involve one or more of the following aspects, features and/or functionality. Systems and methods herein may include or involve a separation kernel hypervisor. According to some implementations, a software entity in hypervisor context that partitions the native hardware platform resources, in time and space, in an isolated and secure fashion may be utilized. Here, for example, embodiments may be configured for partitioning/isolation as between a plurality of guest operating system virtual machine protection domains (e.g., entities in a hypervisor guest context).

The separation kernel hypervisor may host a plurality of guest operating system virtual machine protection domains and may host a plurality of detection mechanisms including detection mechanisms which may execute within such guest operating system virtual machine protection domains. The detection mechanisms may execute in an environment where guest operating systems cannot tamper with, bypass, or corrupt the detection mechanisms. The detection mechanisms may also execute to increase temporal and spatial locality of the guest operating system's resources. Further, in some implementations, the detection mechanisms may execute in a manner that is not interfered with, nor able to be interfered with, nor corrupted by other guest operating system virtual machine protection domains including their corresponding guest operating systems. The detection mechanisms include, but are not limited to, performing one or more of the following actions on guest operating systems related to memory access, such as monitoring of guest OS memory access to pages of interest including sensitive memory regions, and/or actions in response thereto.

Such monitoring may include, but is not limited to, actions pertaining to observation, detection, mitigation, prevention, tracking, modification, reporting upon, memory access within and/or by a guest operating system and/or by entities configured to perform such monitoring.

FIG. 1 is a block diagram illustrating an exemplary system and separation kernel hypervisor architecture consistent with certain aspects related to the innovations herein. FIG. 1 also shows a separation kernel hypervisor executing on native hardware platform resources, e.g., where the separation kernel hypervisor may support the execution, isolated and partitioned in time and space, between a plurality of guest operating system protection domains. Here, a guest operating system domain may be an entity that is established and maintained by the separation kernel hypervisor in order to provide a secure and isolated execution environment for software. Referring to FIG. 1, a separation kernel hypervisor 100 is shown executing on top of the native hardware platform resources 600. Further, the separation kernel hypervisor 100 supports the execution of a guest operating system virtual machine protection domain 200.

The separation kernel hypervisor 100 may also support the execution of a plurality of guest operating system virtual machine protection domains, e.g., 200 to 299 in FIG. 1. In some implementations, the separation kernel hypervisor may provide time and space partitioning in a secure and isolated manner for a plurality of guest operating system virtual machine protection domains, e.g., 200 to 299 in FIG. 1. Such features may include rigid guarantees on scheduling resources, execution time, latency requirements, and/or resource access quotas for such domains.

According to some implementations, in terms of the sequence of establishment, after the native hardware platform resources 600 boot the system, execution is transitioned to the separation kernel hypervisor 100. The separation kernel hypervisor 100 then creates and executes a guest operating system virtual machine protection domain 200, or a plurality of guest operating system virtual machine protection domains, e.g., 200 to 299 in FIG. 1. Some implementations of doing so consonant with the innovations herein are set forth in PCT Application No. PCT/2012/042330, filed 13 Jun. 2012, published as WO2012/177464A1, and U.S. patent application Ser. No. 13/576,155, filed Dec. 12, 2013, published as US2014/0208442 A1, which are incorporated herein by reference in entirety.

Consistent with aspects of the present implementations, it is within a guest operating system virtual machine protection domain that a guest operating system may execute. Further, it is within a guest operating system virtual machine protection domain that detection mechanisms may also execute, e.g., in a fashion isolated from any guest operating system which may also execute within that same guest operating system virtual machine protection domain, or in other guest operating system virtual machine protection domains.

Figure 2A:
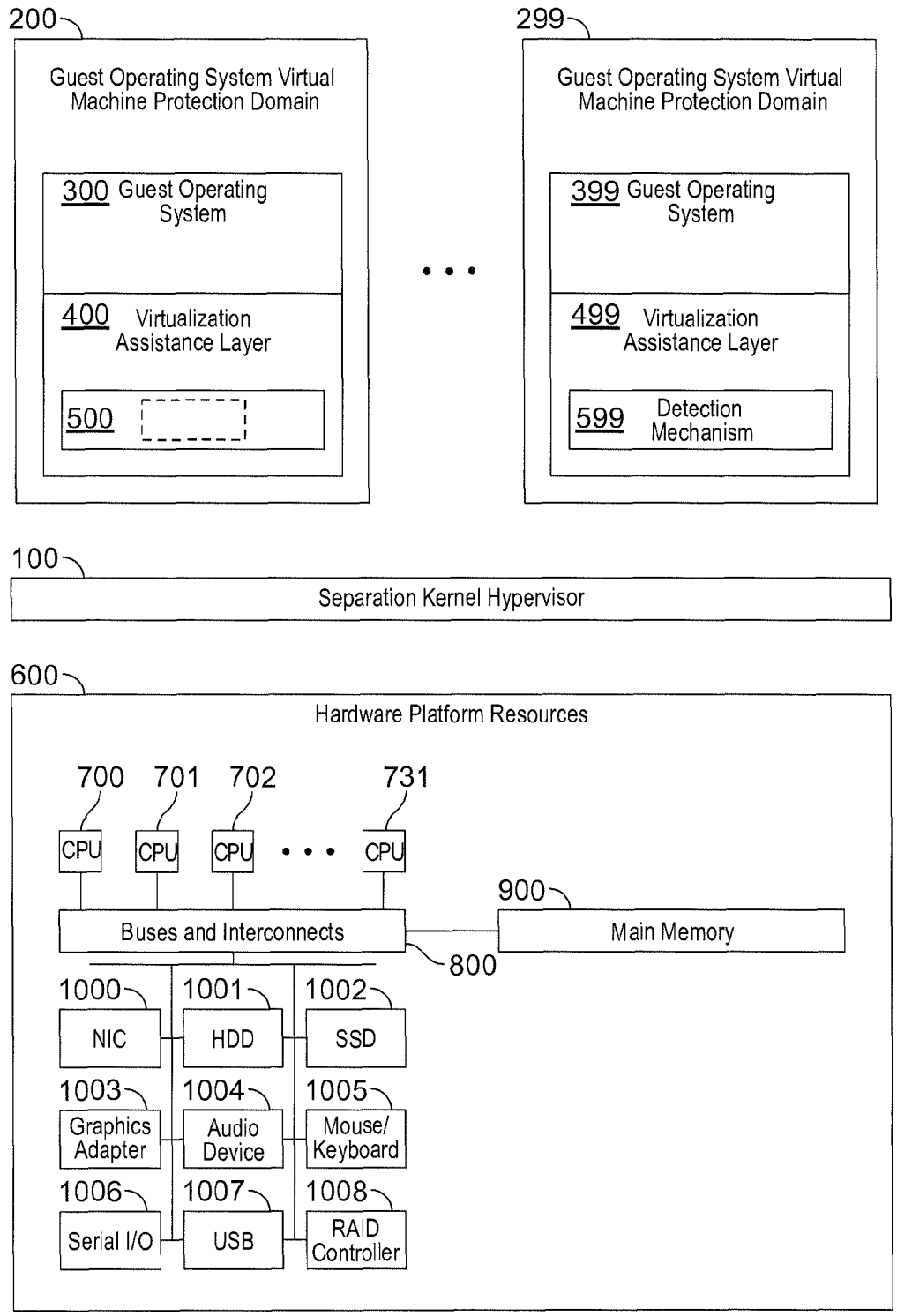
FIG. 2A is a block diagram illustrating an exemplary system and Separation Kernel Hypervisor architecture consistent with certain aspects related to the innovations herein.

FIG. 2A is a block diagram illustrating an exemplary system and separation kernel hypervisor architecture consistent with certain aspects related to the innovations herein. FIG. 2A also shows a separation kernel hypervisor executing on native hardware platform resources (where the native platform resources may include a plurality of CPUs, buses and interconnects, main memory, Network Interface Cards (MC), Hard Disk Drives (HDD), Solid State Drives (SSD), Graphics Adaptors, Audio Devices, Mouse/Keyboard/Pointing Devices, Serial I/O, USB, and/or Raid Controllers, etc.), where the separation kernel hypervisor may support the execution, isolated and/or partitioning in time and space, between a plurality of guest operating system protection domains. Here, some implementations may involve a guest operating system protection domains which may contain a guest operating system, and/or a virtualization assistance layer (which itself may contain detection mechanisms).

FIG. 2A shows both a guest operating system 300, and a virtualization assistance layer 400 executing within the same guest operating system virtual machine protection domain 200. In some implementations, the virtualization assistance layer 400 may provide the execution environment for the memory access detection mechanisms 500 (hereinafter "detection mechanisms"). Further, the virtualization assistance layer 400 may assist the separation kernel hypervisor in virtualizing portions of the platform resources exported to a given guest operating system (e.g., Virtual CPU/ABI, Virtual chipset ABI, set of virtual devices, set of physical devices, and/or firmware, etc., assigned to a given guest operating system 300 and/or guest virtual machine protection domain 200). Some systems and methods herein utilizing such virtualization assistance layer may include or involve (but are not strictly limited to) a self-assisted virtualization component, e.g., with an illustrative implementation shown in FIG. 2D.

The guest operating system 300 and the virtualization assistance layer 400 (which may include detection mechanism(s) 500) are isolated from each other by the separation kernel hypervisor 100. In implementations herein, the guest operating system 300 cannot tamper with, bypass, or corrupt the virtualization assistance layer 400, nor can it tamper with, bypass or corrupt the detection mechanisms 500. Since the detection mechanisms 500 are isolated from the guest operating system 300, the detection mechanisms 500 are able to act on a portion of (or the entirety, depending on policy and configuration) of the guest operating system 300 and its assigned resources in a manner that is (a) is transparent to the guest operating system 300 and (b) not able to be tampered with by the guest operating system 300 or its assigned resources (e.g., errant and/or malicious device DMA originated by devices assigned to the guest operating system 300), and (c) not able to be bypassed by the guest operating system 300. For example, the detection mechanisms 500, within the given virtualization assistance layer 400, may read and/or modify portions of the guest operating system 300 and resources to which the Guest Operating System 300 has been granted access (by the Separation Kernel Hypervisor 100), while none of the Guest Operating System 300 nor the resources to which has access may modify any portion of the detection mechanisms 500 and/or virtualization assistance layer 400.

By having a given virtualization assistance layer 400 and a given Guest Operating System 300 within the within the same Guest Virtual Machine Protection Domain 200, isolated from each other by the Separation Kernel Hypervisor 100, various benefits, non-penalties, or mitigation of penalties, such as the following, may be conferred to the system at large and to the detection mechanisms 500:

Increased Spatial and Temporal Locality of Data

By being contained within the same Guest Virtual Machine Protection Domain 300, the virtualization assistance layer 200, and/or corresponding private (local) detection mechanisms 500 existing in that same Guest Virtual Machine Protection Domain 300, have greater access, such as in time and space, to the resources of the Guest Operating System 300 than would entities in other guest virtual machine protection domains or other Guest Operating Systems; e.g., the subject guest virtual machine protection domain has faster responsiveness and/or has lower latency than if processed in another guest virtual machine protection domain. Though such resources are still accessed in a manner that is ultimately constrained by the Separation Kernel Hypervisor 100, there is less indirection and time/latency consumed in accessing the resources:

In one illustrative case, the detection mechanisms 500 private (local) to a given Guest virtualization assistance layer 200 and its associated Guest Operating System 300 can react faster to physical memory access issues, and not need to wait on actions from another entity in another guest virtual machine protection domain 200 or guest operating system 300 (which may themselves have high latency, be corrupted, unavailable, poorly scheduled, or subject to a lack of determinism and/or resource constraint, or improper policy configuration, etc.).

Here, for example, if a Guest Operating System 300 was to monitor a Guest Operating System 399 located within another Guest Virtual Machine Protection Domain 107, it would encounter penalties in time and space for accessing that Guest Operating System and its resources; furthermore, there is increased code, data, scheduling, and/or security policy complexity to establish and maintain such a more complex system; such increases in complexity and resources allow for more bugs in the implementation, configuration, and/or security policy establishment and maintenance.

Scalability and Parallelism

Each Guest Operating System 300 may have a virtualization assistance layer 200, and detection mechanisms 500, that are private (local) to the Guest Virtual Machine Protection Domain 200 that contains both that Guest Operating System 300, the virtualization assistance layer 400, and the detection mechanisms.

Fault Isolation, Low Level of Privilege, Defense in Depth, Locality of Security Policy, and Constraint of Resource Access Here, for example, relative to the extremely high level of privilege of the separation kernel hypervisor 100, the virtualization assistance layer 400, the detection mechanism 500, and the Guest Operating System 300 within the same Guest Virtual Machine Protection Domain 200 are only able to act on portions of that Guest Virtual Machine Protection Domain 200 (subject to the Separation Kernel Hypervisor 100) and not portions of other Guest Virtual Machine Protection Domains (nor their contained or assigned resources).

Subject to the isolation guarantees provided by the Separation Kernel Hypervisor 100, the virtualization assistance layer 400 accesses only the resources of the Guest Operating System 300 within the same Guest Virtual Machine Protection Domain 200 and that virtualization assistance layer 400 is not able to access the resources of other Guest Operating Systems.

As such, if there is corruption (bugs, programmatic errors, malicious code, code and/or data corruption, or other faults, etc.) within a given Guest Virtual Machine Protection Domain 200 they are isolated to that Guest Virtual Machine Protection Domain 200. They do not affect other Guest Virtual Machine Protection Domains 299 nor do they affect the Separation Kernel Hypervisor 100. This allows the Separation Kernel Hypervisor to act upon (e.g., instantiate, maintain, monitor, create/destroy, suspend, restart, refresh, backup/restore, patch/fix, import/export etc.) a plurality of Guest Virtual Machine Protection Domains 200 and their corresponding virtualization assistance layer 400 and detection mechanisms 500 (or even Guest Operating Systems 300) without corruption of the most privileged execution context of the system, the Separation Kernel Hypervisor 100.

Similarly, the faults that may occur within a virtualization assistance layer 400 or the detection mechanisms 500 (e.g., by corruption of software during delivery) are contained to the Guest Virtual Machine Protection Domain 200 and do not corrupt any other Guest Virtual Machine Protection Domain; nor do they corrupt the Separation Kernel Hypervisor 100.

Furthermore, the faults within a Guest Operating System 300 are contained to that Guest Operating System 300, and do not corrupt either the virtualization assistance layer 400 or the detection mechanisms 500.

Figure 2B:
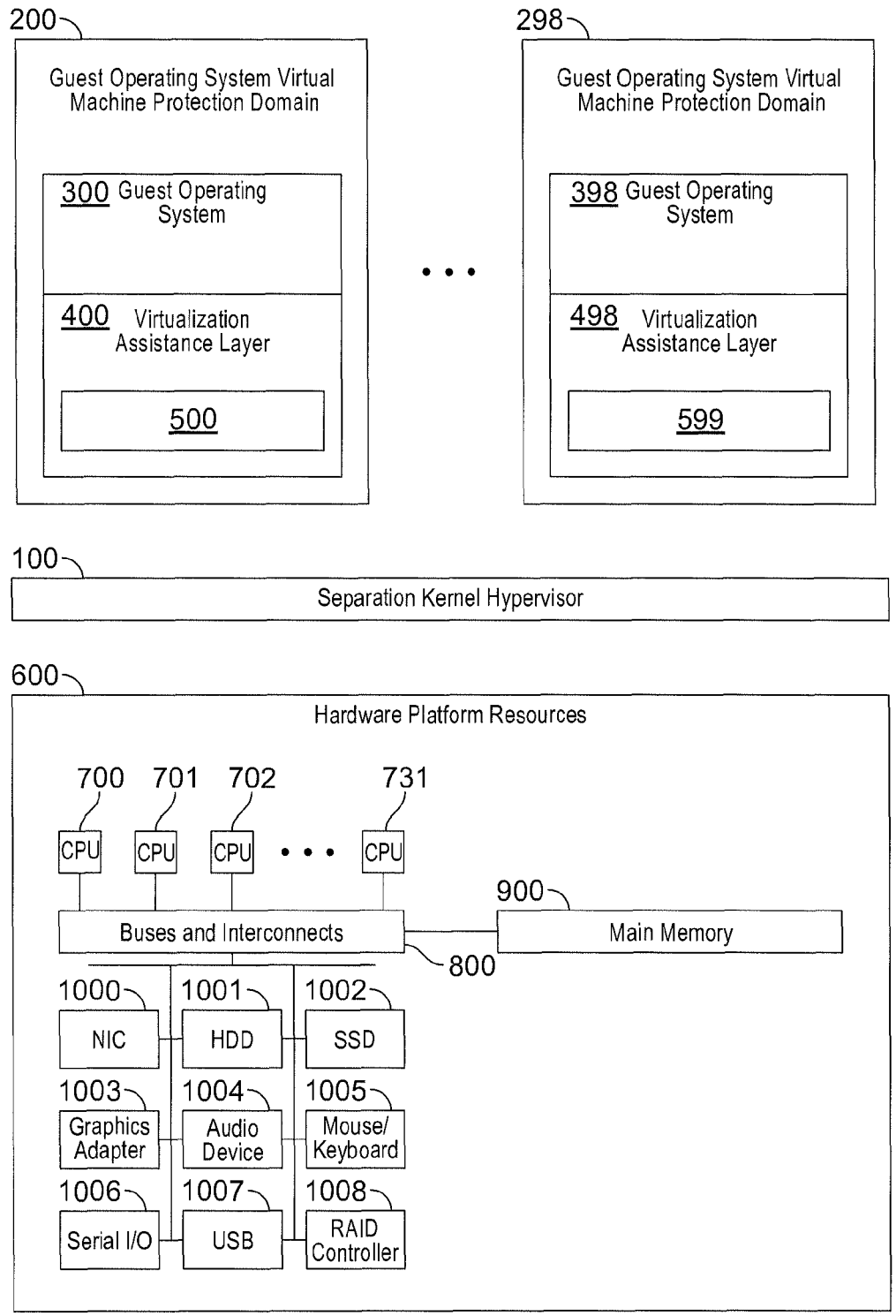
FIG. 2B is a block diagram illustrating an exemplary system and Separation Kernel Hypervisor architecture consistent with certain aspects related to the innovations herein.

FIG. 2B is a block diagram illustrating an exemplary system and separation kernel hypervisor architecture consistent with certain aspects related to the innovations herein. FIG. 2B illustrates a variation of FIG. 2A where a minimal runtime environment 398 executes in place of a (larger/more complex) guest operating system. Here, a minimal runtime environment may be an environment such as a VDS (virtual device server), and/or a LSA (LynxSecure application), etc. The minimal runtime environment 398 can be used for policy enforcement related to activities reported by a virtualization assistance layer and/or detection mechanisms; such an environment is also monitored by a virtualization assistance layer and/or detection mechanisms private to the guest operating system virtual machine protection domain containing the minimal runtime environment.

Figure 2C:
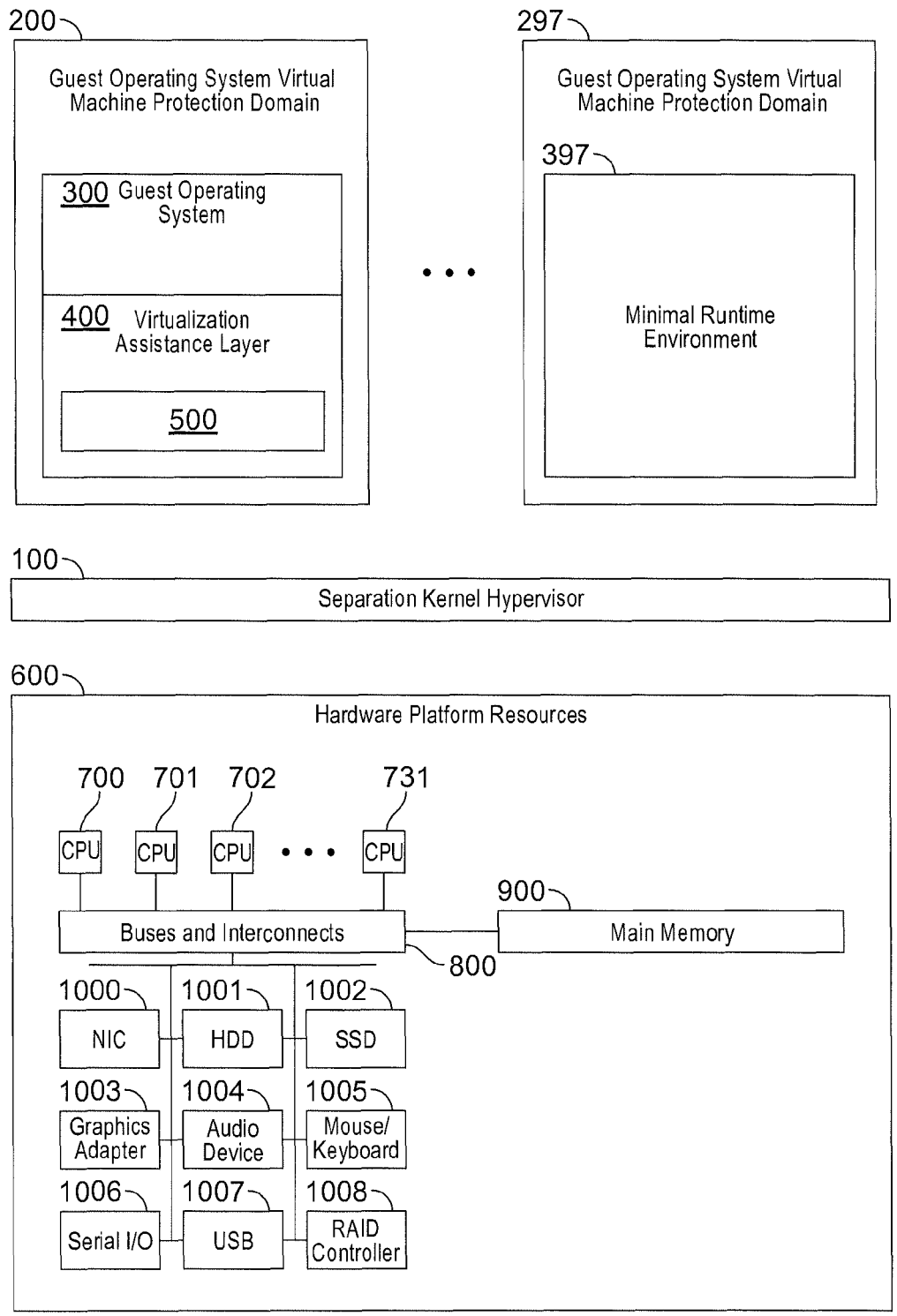
FIG. 2C is a block diagram illustrating an exemplary system and Separation Kernel Hypervisor architecture consistent with certain aspects related to the innovations herein.

FIG. 2C is a block diagram illustrating an exemplary system and separation kernel hypervisor architecture consistent with certain aspects related to the innovations herein. FIG. 2C illustrates a variation of FIG. 2A and FIG. 2B where a minimal runtime environment executes in place of a (larger/more complex) guest operating system but without a virtualization assistance layer or detection mechanisms.

Figure 2D:
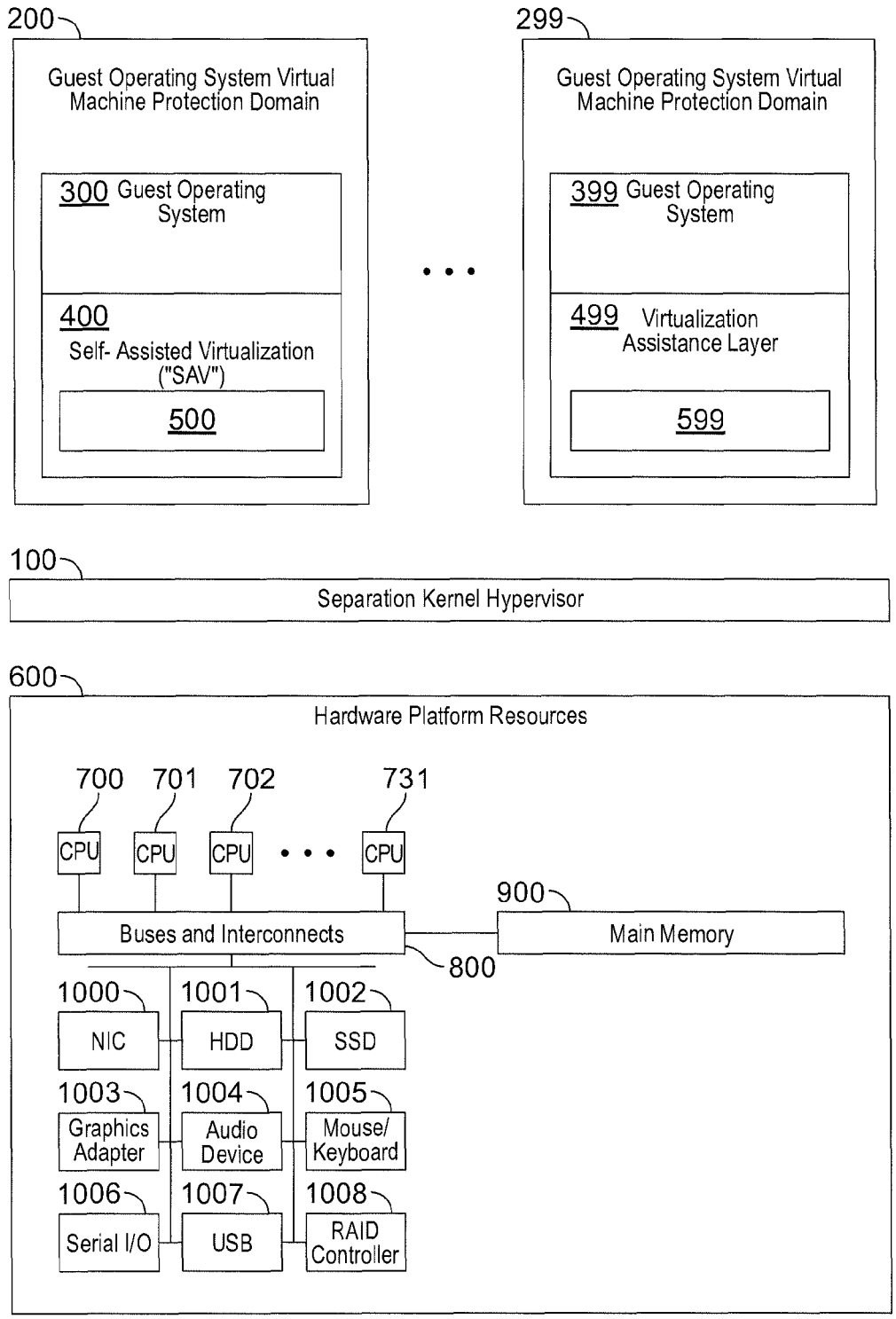
FIG. 2D is a block diagram illustrating an exemplary system and Separation Kernel Hypervisor architecture consistent with certain aspects related to the innovations herein.

FIG. 2D is a block diagram illustrating an exemplary system and Separation Kernel Hypervisor architecture consistent with certain aspects related to the innovations herein. FIG. 2D illustrates a variation of FIG. 2 where a Self-Assisted Virtualization (SAV) mechanism is used to implement the virtualization assistance layer.

Figure 3:
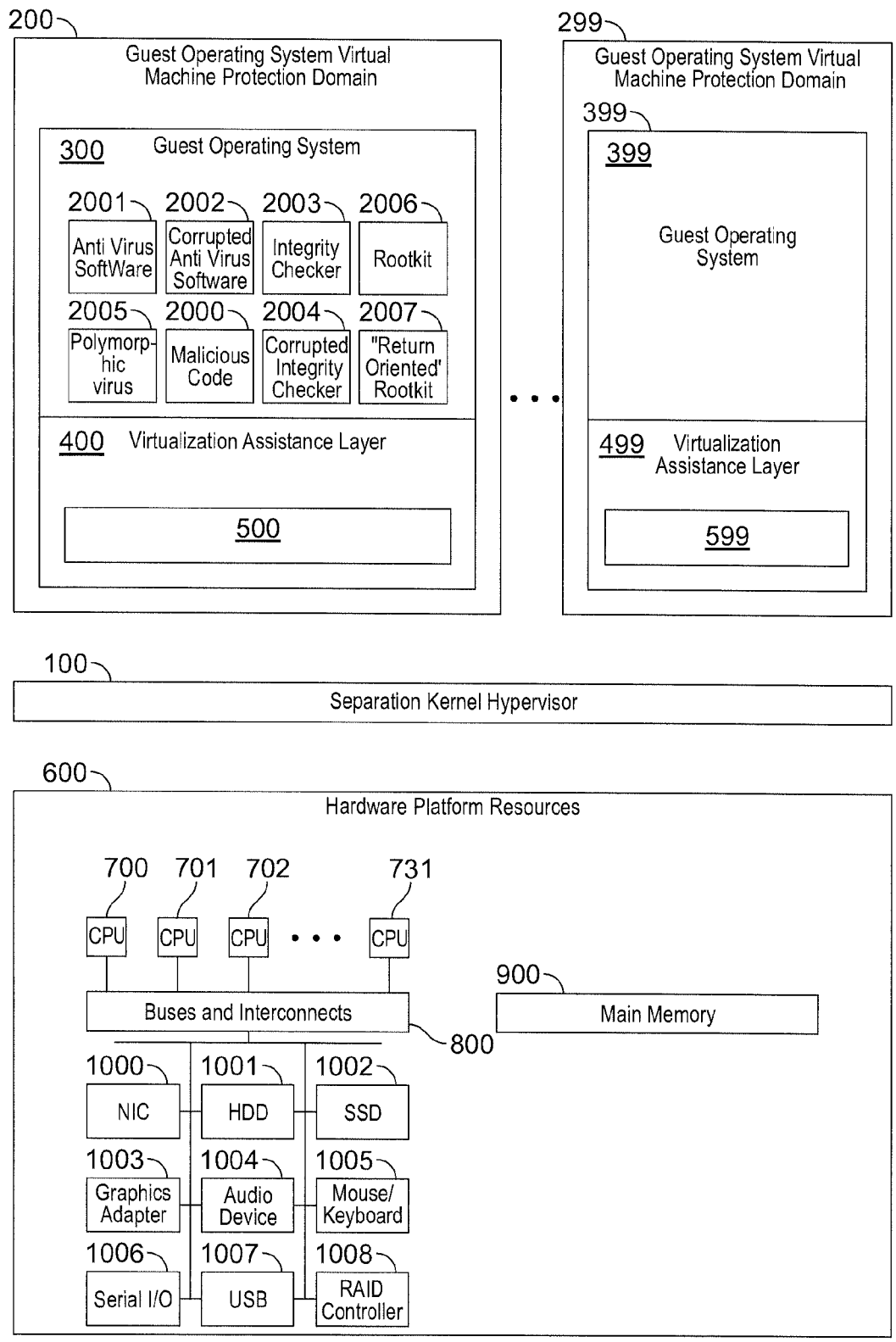
FIG. 3 is a block diagram illustrating an exemplary system and separation kernel Hypervisor architecture consistent with certain aspects related to the innovations herein.

FIG. 3 is a block diagram illustrating an exemplary system and separation kernel Hypervisor architecture consistent with certain aspects related to the innovations herein. FIG. 3 also shows certain detailed aspects with respect to FIGS. 2A/B, where the guest operating system may attempt to access pages of interest at specified memory locations that may include a plurality of code and/or data which may constitute execution contexts which may include the following types of software including any/all of which malicious code may attempt to corrupt or utilize: malicious code, anti-virus software, corrupted anti-virus software, integrity checkers, corrupted integrity checkers, rootkits, return oriented rootkits, etc. The invention is not limited to memory access attempts by malicious code and is discussed below via illustrative examples.

For example, in FIG. 3, if antivirus software 2001 executes within a given guest operating system 300, and such antivirus software 2001 is itself corrupted, and itself executes malicious code 2002 or fails to prevent the execution of malicious code 2002, the corruption is constrained to the given guest operating system 300, and the corruption may be acted upon (e.g., detected, notified, prevented, mitigated, reported, tracked, modified/patched, suspended, halted, restarted, eradicated, etc.) by the memory access detection mechanisms 500 that monitors/acts on memory access attempts such as to pages of interest, and is provided within the same guest virtual machine protection domain 200 as the guest operating system 300.

With regard to other exemplary implementations, as may be appreciated in connection with FIG. 3, if an integrity checker 2003 (e.g., a "security" component or driver within a guest operating system 300) executes within a given guest operating system 300, and such integrity checker 2003 is itself corrupted into a corrupted integrity checker 2004 (and executes malicious code, or fails to prevent the execution of malicious code), the corruption is constrained to the given guest operating system 300, and the corruption may be acted upon (e.g., detected, notified, prevented, mitigated, reported, tracked, modified/patched, suspended, halted, restarted, eradicated, etc.) by the detection mechanisms 500 that monitors/acts on memory access attempts to pages of interest, and is provided within the same guest virtual machine protection domain 200 as the guest operating system 300.

With regard to another illustration, again with reference to FIG. 3, if a rootkit 2006 executes within the guest operating system 300 (e.g., by having fooled the Integrity Checker 2003 by the nature of the root kit being a return oriented rootkit 2007, which are designed specifically to defeat integrity checkers) the corruption is constrained to the given guest operating system 300, and the corruption may be acted upon (e.g., detected, notified, prevented, mitigated, reported, tracked, modified/patched, suspended, halted, restarted, eradicated, etc.) by the detection mechanisms 500 that monitors/acts on memory access attempts to pages of interest, and is provided within the same guest virtual machine protection domain 200 as the guest operating system 300.

In another example, again with respect to FIG. 3, if a polymorphic virus 2005 (an entity designed to defeat integrity checkers, among other things) executes within the guest operating system 300 (e.g., by having fooled the integrity checker 2003, or by having the a corrupted integrity checker 2003) the corruption is constrained to the given guest operating system 300, and the corruption may be acted upon (e.g., detected, notified, prevented, mitigated, reported, tracked, modified/patched, suspended, halted, restarted, eradicated, etc.) by the detection mechanisms 500 that monitors/acts on memory access attempts to pages of interest, and is provided within the same guest virtual machine protection domain 200 as the guest operating system 300.

In general, referring to FIG. 3, if a malicious code 2000 executes within the guest operating system 300 (e.g., by means including, but not limited strictly to bugs, defects, bad patches, code and/or data corruption, failed integrity checkers, poor security policy, root kits, viruses, trojans, polymorphic viruses, and/or other attack vectors and/or sources of instability within the guest operating system 300 etc.), the corruption is constrained to the given guest operating system 300, and the corruption may be acted upon (e.g., detected, notified, prevented, mitigated, reported, tracked, modified/patched, suspended, halted, restarted, eradicated, etc.) by the detection mechanisms 500 that monitors/acts on memory access attempts to pages of interest, and is provided within the same guest virtual machine protection domain 200 as the guest operating system 300.

Furthermore, in the examples above and other cases, such corruption of the guest operating system 300, and the resources to which it has access, do not corrupt the detection mechanisms 500, the virtualization assistance layer 400, the guest virtual machine protection domain 200, or plurality of other such resources in the system (e.g., other guest virtual machine protection domains 299), or the separation kernel hypervisor 100.

In some implementations, the detection mechanisms 500, in conjunction with the virtualization assistance layer 400, and the separation kernel hypervisor 100, may utilize various methods and mechanisms such as the following, given by way of illustration and example but not limitation, to act with and upon its associated guest operating system 300 the resources assigned to the guest operating system 300, and the systems behavior generated thereto and/or thereby.

Figure 4:
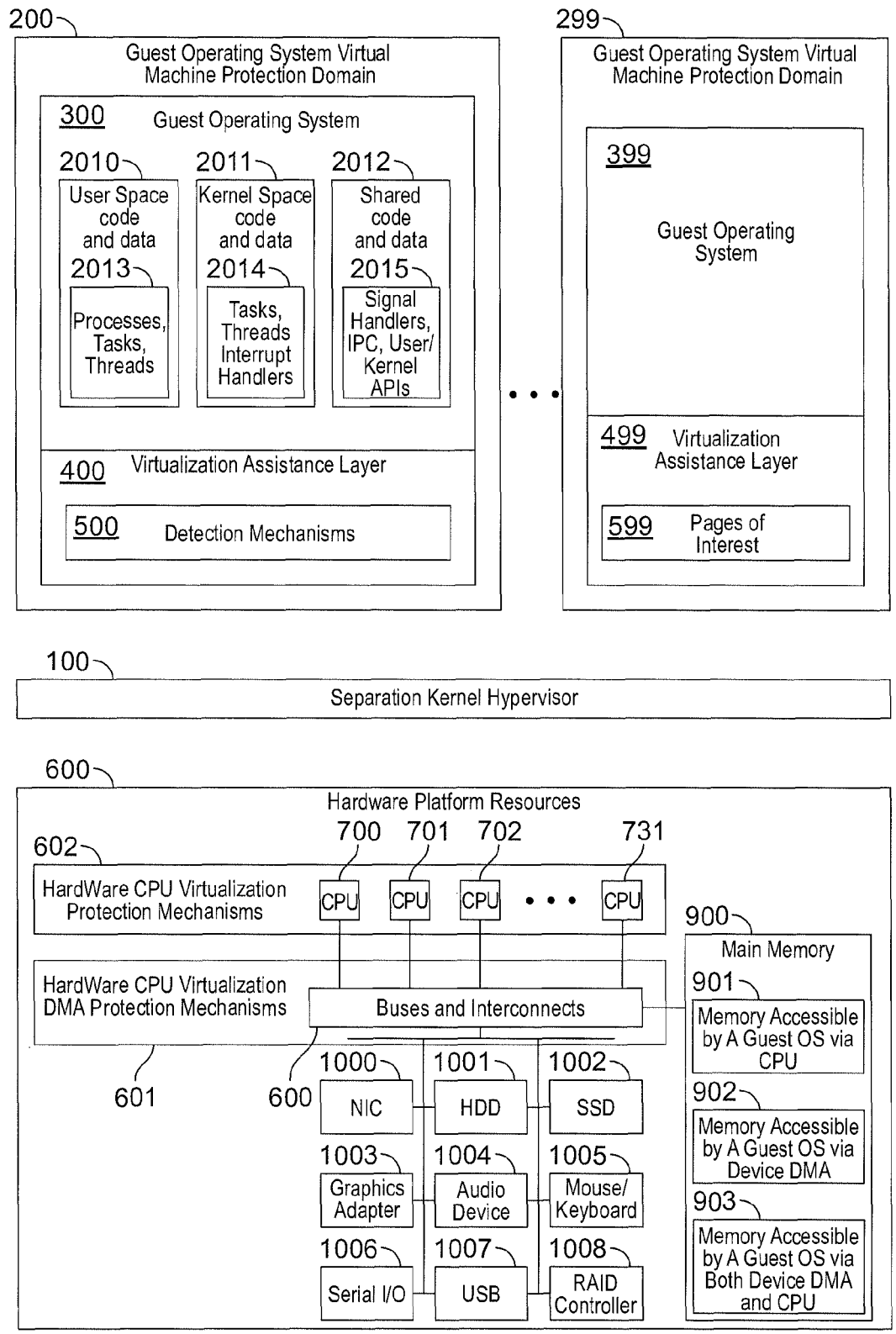
FIG. 4 is a block diagram illustrating an exemplary system and separation kernel hypervisor architecture consistent with certain aspects related to the innovations herein.

FIG. 4 is a block diagram illustrating an exemplary system and separation kernel hypervisor architecture consistent with certain aspects related to the innovations herein. For example, FIG. 4 illustrates resources that may be assigned to a Guest Operating System 300 consistent with certain aspects related to the innovations herein.

FIG. 4 shows an illustrative extension of either FIG. 2, and/or FIG. 3, where the guest operating system may have a plurality of code and/or data which may constitute execution contexts which may include the following types of software mechanisms and/or constructs user space code and data that may be associated with an unprivileged mode of CPU Malware execution (as used herein 'user space' being an execution environment of low privilege, versus an execution environment of high privilege, such as kernel space), which may contain processes, tasks, and/or threads, etc.; kernel space code and data, that may be associated with a privileged mode of CPU execution, which may contain tasks, threads, interrupt handlers, drivers, etc.; shared code and data, that may be associated with either privileged and/or unprivileged modes of CPU execution, and which may include signal handlers, Inter Process Communication Mechanisms (IPC), and/or user/kernel mode APIs. It also may include main memory that may be accessed by the CPU, by DMA from devices, or both. It also shows protection mechanisms including hardware CPU virtualization protection mechanisms, and hardware virtualization DMA protection mechanisms. APIs of interest mechanism 500, 599 may reside within corresponding Virtualization Assistance Layers 400, 499

Such resources, explained here by way of example, not limitation, may include a subset of (a) hardware platform resources 600, virtualized hardware platform resources (hardware platform resources 600 subject to further constraint by the separation kernel hypervisor 100, the hardware CPU virtualization protection mechanisms 602, and/or the hardware virtualization DMA protection mechanisms 601), and execution time on a CPU 700 (or a plurality of CPUs, e.g., 700 to 731) (scheduling time provided by the separation kernel hypervisor 100), and space (memory 900 provided by the separation kernel hypervisor) within which the guest operating system 300 may instantiate and utilize constructs of the particular guest operating system 300, such as a privileged ("kernel" space) modes of execution, non-privileged ("user" space) modes of execution, code and data for each such mode of execution (e.g., processes, tasks, threads, interrupt handlers, drivers, signal handlers, inter process communication mechanisms, shared memory, shared APIs between such entities/contexts/modes, etc.

Figure 5:
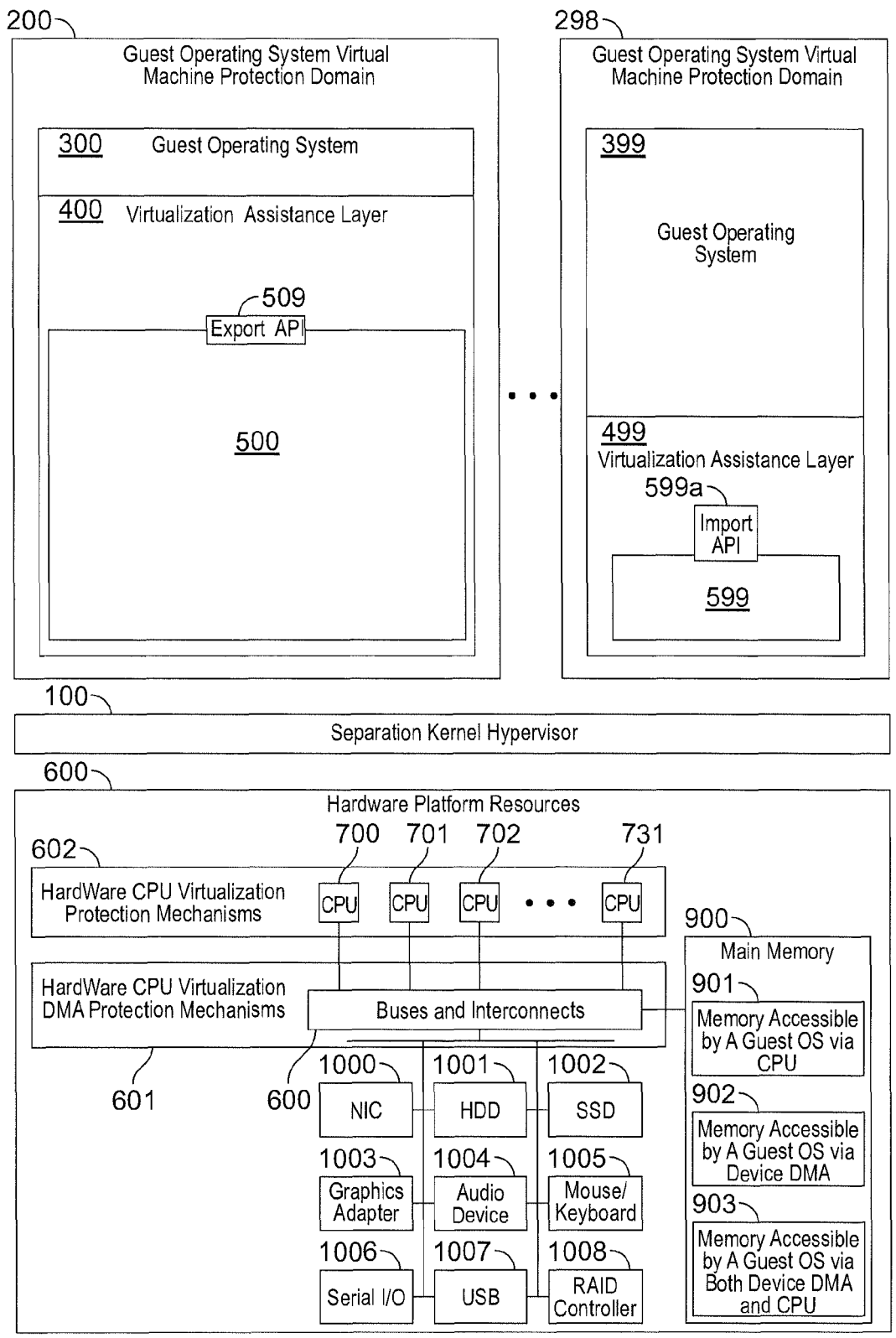
FIG. 5 is a block diagram illustrating an exemplary system and separation kernel hypervisor architecture consistent with certain aspects related to the innovations herein.

FIG. 5 is a block diagram illustrating an exemplary system and separation kernel hypervisor architecture consistent with certain aspects related to the innovations herein. FIG. 5 shows an illustrative implementation as may be associated with FIG. 2, FIG. 3, and/or FIG. 4, where the detection mechanisms, that may be within the virtualization assistance layer, may include the following monitoring systems and mechanisms: memory monitor, an instruction monitor, etc. FIG. 5 also illustrates import/export mechanism that may be used by a virtualization assistance layer and/or detection mechanisms to communicate between themselves and other virtualization assistance layer and/or detection mechanisms in other guest operating system virtual machine protection domains (subject to the security policies established, maintained, and enforced by the separation kernel hypervisor), in an isolated, secure, and even monitored fashion.

FIG. 5 illustrates mechanism and resources that may be used by the detection mechanisms 500 to monitor a guest operating system 300. Such mechanisms and resources may include a memory monitor 501 and an instruction monitor 502.

The virtualization assistance layer 400 and/or the detection mechanisms 500 may also use an export API 509 and/or an import API 599 (as may be configured and governed by the separation kernel hypervisor 100), in order to provide secure communication between a plurality of virtualization assistance layers (e.g., virtualization assistance layers 400 to 499) and/or a plurality of detection mechanisms (e.g., detection mechanisms 500 to 599).

Innovations set forth herein, as also described in additional detail elsewhere herein via notation to the reference numerals in the description below, reside around various combinations, subcombinations and/or interrelated functionality of the following features or aspects: (i) a Separation Kernel Hypervisor that ensures the isolation of multiple guest Operating Systems each in its own Virtual Machine (VM); (ii) a Separation Kernel Hypervisor as in (i) that implements a mechanism whereby a suitably authorized guest can send a list of memory locations to be watched to another guest; (iii) a separation kernel hypervisor as in (ii) that implements a mechanism whereby a suitably authorized guest can send a message to another guest; (iv) a Virtualization Assistance Layer (VAL) of software that runs within the same protection domain as the guest Virtual Machine but is not directly accessible by the guest; (v) a Virtualization Assistance Layer as in (iv) that implements a virtual motherboard containing a virtual CPU and memory; (vi) a VAL as in (v) that implements a mechanism to unmap specified pages on demand from another guest; (vii) a VAL as in (vi) that processes unmapped page exceptions taken by its associated guest virtual machine; (viii) a VAL as in (vii) that can pause the execution of its associated guest virtual machine; (ix) a VAL as in (viii) that can inject a page-not-found exception into its associated guest virtual machine; and/or (x) a VAL as in (ix) that can send a notification of the memory access and associated context information to the requesting guest.

Systems and mechanisms, and example embodiments, of the detection mechanisms 500 may include:

1. Monitoring of CPU (and CPU cache based) guest OS memory access (originated from a plurality of resources available to the guest operating system 300 (in FIGS. 3 and 4), including CPUs and/or caches assigned and/or associated with such), as directed by execution and resources (shown in FIG. 3) within the guest OS 300. For memory assigned to the guest OS 300, such as a subset of the main memory 900 (in FIGS. 2, 3, 4, and 5) the separation kernel hypervisor 100 may trap access to that memory, and then pass associated data of that trap to the virtualization assistance layer 400. The virtualization assistance layer 400 may then pass the associated data of that trap to the detection mechanisms 500.

The virtualization assistance layer 400, detection mechanisms 500, and/or the separation kernel hypervisor 100 may use feedback mechanisms between themselves to recognize and monitor patterns of guest operating system 300 memory access; not strictly one-off memory access attempts.

The monitoring of guest operating system 300 memory access includes, but is not limited to, constructs in guest operating system 300 memory which may have semantics specific to a particular CPU, processor ABI, architecture (or micro-architecture). For example, the Interrupt Descriptor Table ("IDT"), the Global Descriptor Table ("GDT"), or Local Descriptor Table(s) ("LDT(s)") on a modern Intel IA32e platform; any of which may be targeted by malicious code (from FIG. 3) and/or entities within the guest OS (from FIG. 4).

The monitoring of guest operating system 300 memory access includes, but is not limited to, constructs in guest operating system 300 memory (including the resources in the guest operating system 300 in FIGS. 3 and 4) which may have semantics specific to a particular guest operating system 300 or a set of applications hosted by the guest operating system 300 (possibly including antivirus software).

The virtualization assistance layer 400, detection mechanisms 500, and/or the Separation Kernel Hypervisor 100 may use feedback mechanisms between themselves to recognize and monitor patterns of Guest Operating System 300 DMA access to memory; not strictly one-off access attempts.

Figure 6A:
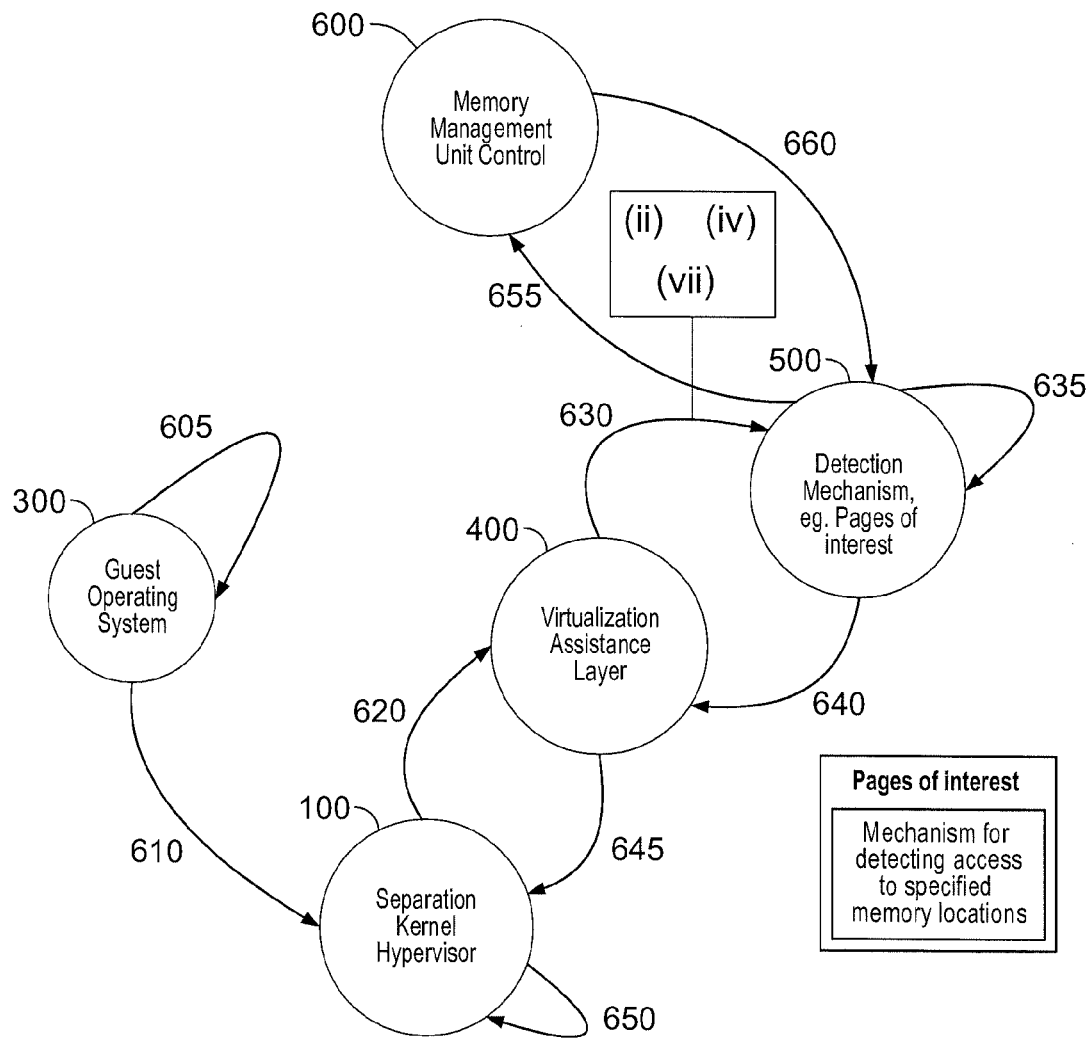
FIGS. 6A-6B are representative sequence/flow diagrams illustrating exemplary systems, methods and separation kernel hypervisor architecture consistent with certain aspects related to the innovations herein.
Figure 6B:
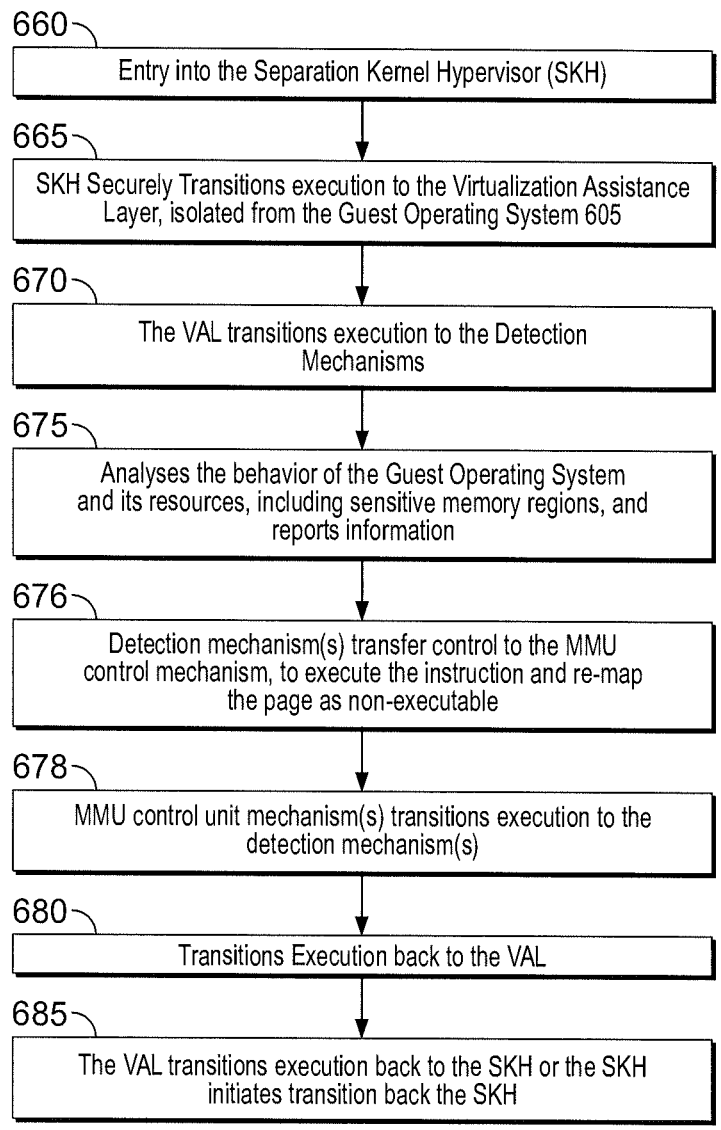

Illustrative aspects, here, are shown in FIGS. 6A-6B.

2. Monitoring of specific Guest Operating System 300 instruction execution attempts, and/or specific instruction sequence execution attempts.

For all such attempts by the Guest Operating System 300, the Separation Kernel Hypervisor 100 (when configured to do so, or via feedback receive from the virtualization assistance layer 400 and/or the detection mechanisms 500) may trap such access attempts, then pass associated data of that trap to the virtualization assistance layer 400 and/or detection mechanisms 500.

The virtualization assistance layer 400 and/or the detection mechanisms 500 can respond to such instruction sequences; including, but not limited to, recognition of a significant fraction of a given sequence, then prevent/block the final instructions of the malicious sequence from execution.

Figure 7A:
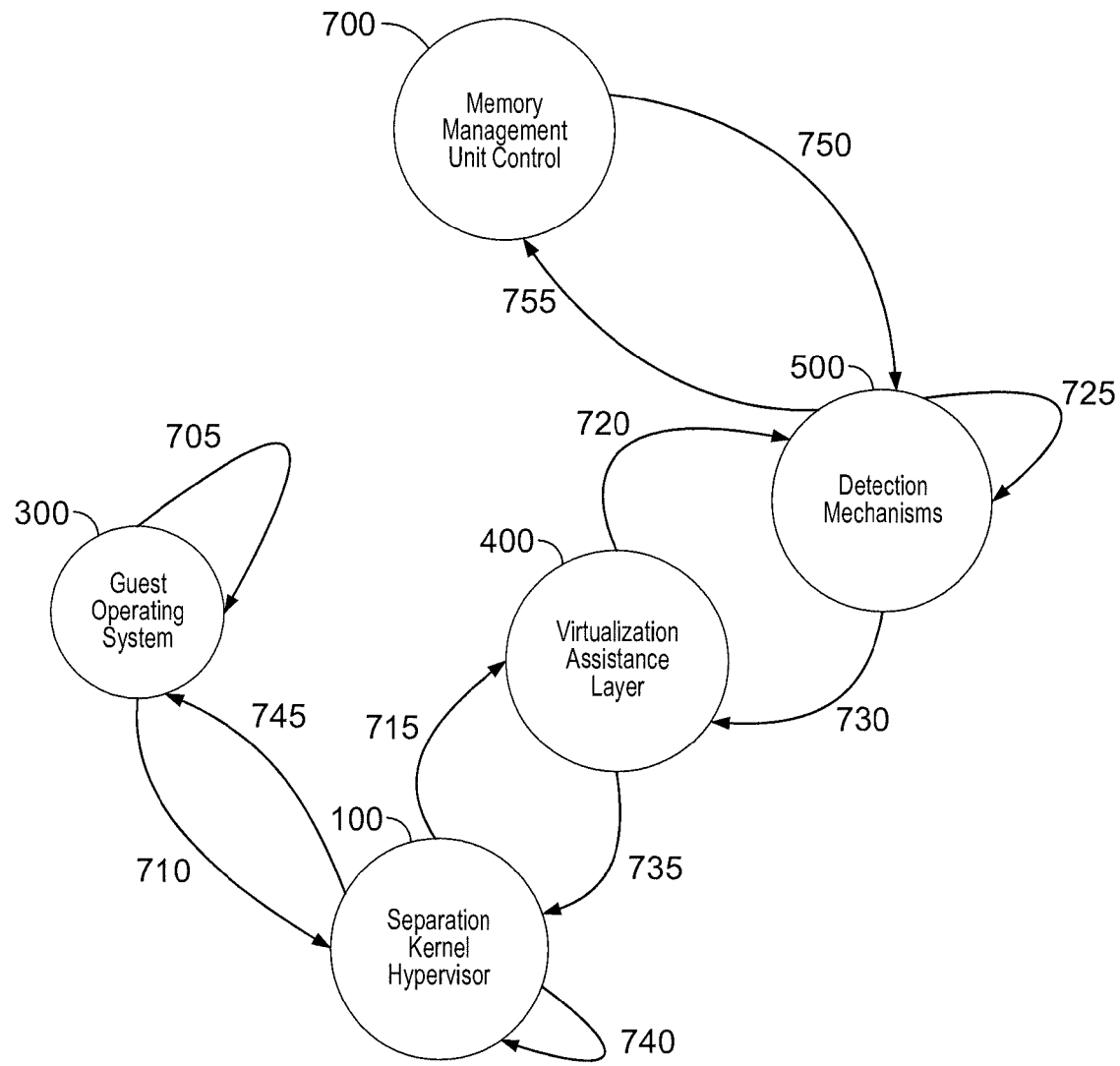
FIGS. 7A-7B are representative sequence/flow diagrams illustrating exemplary systems, methods and separation kernel hypervisor architecture consistent with certain aspects related to the innovations herein.
Figure 7B:
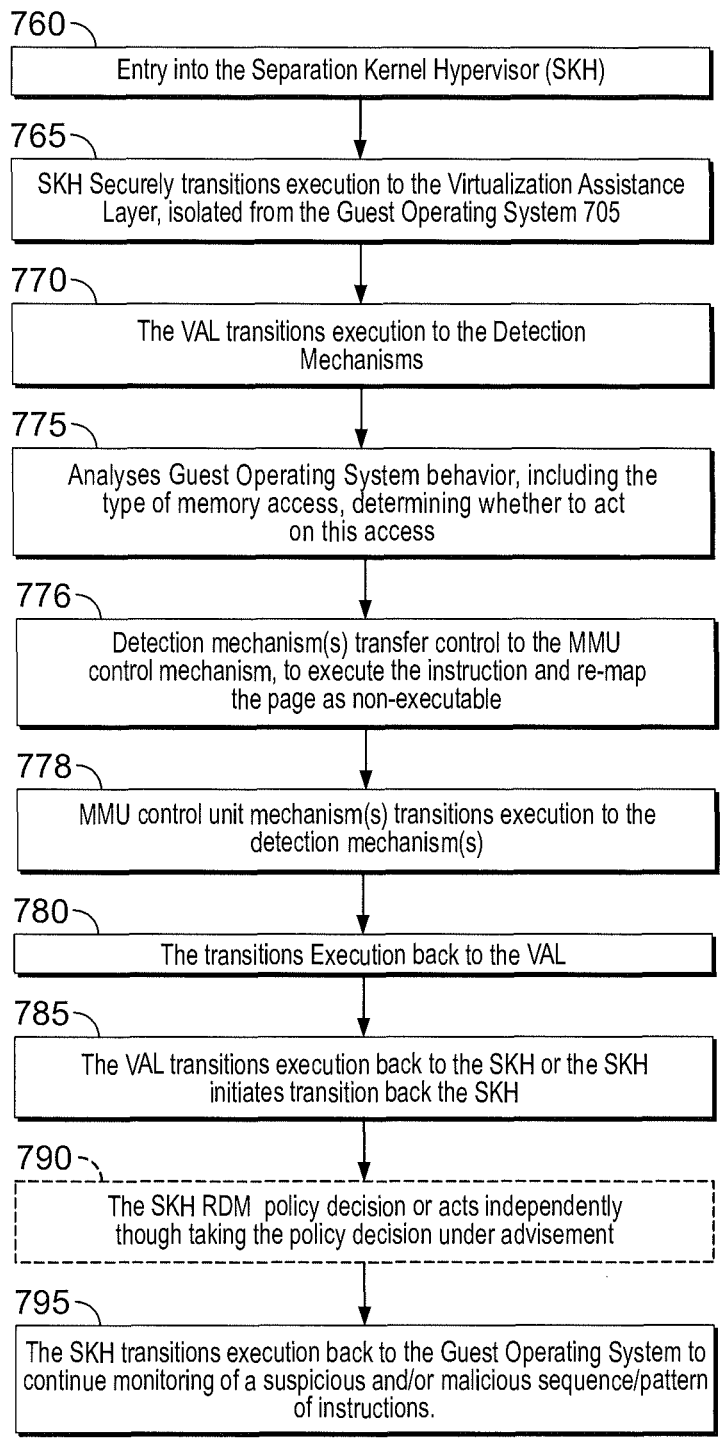

Illustrative aspects, here, are shown in FIGS. 7A-7B.

FIGS. 6A-6B are representative sequence/flow diagrams illustrating exemplary systems, methods and Separation Kernel Hypervisor architecture consistent with certain aspects related to the innovations herein. FIGS. 6A-6B relate, inter alia, to behavior relating to the handling of guest operating system attempts to access main memory.

Turning to the illustrative implementations/aspects of FIG. 6A, at step 605 a Guest Operating System receives a command for memory access to a specified memory location. Then, at step 610, the Guest Operating System attempts to access the memory location(s). The memory access attempt triggers entry into the Separation Kernel Hypervisor. Then, at step 620, the Separation Kernel Hypervisor securely transitions execution to the virtualization assistance layer; in a manner isolated from the Guest Operating System. Next, in step 630 the virtualization assistance layer transitions execution to the detection mechanisms. Step 630 includes steps (ii) and (iv), including step (ii) where the Separation Kernel Hypervisor implements a mechanism whereby a suitably authorized guest can send a list of memory locations to be watched to another guest. A Virtualization Assistance Layer (VAL) of software that runs within the same protection domain as the guest Virtual Machine but is not directly accessible by the guest (step iv). The VAL that processes unmapped page exceptions taken by its associated guest virtual machine (step vii). Then, at step 635 the detection mechanism(s) analyze the behavior of the Guest Operating System and its resources and makes a policy decision. Here, by way of one example, the detection mechanism(s) may be configured to understand the memory locations which are sensitive (contain pages of interest), and, as a function of this information, perform processing to decide to disallow, pause, or continue the memory access attempt. The detection mechanism(s) detect access to specified memory locations, for example. Then, at step 655, the detection mechanism 500 transfers control to a memory management unit (MMU) control mechanism 600. This MMU control mechanism 600 performs the memory management unit (MMU) control operations needed to execute the instruction and map the appropriate page as inaccessible. Additional details of such control operations are set forth further below in connection with FIG. 10. Then, at step 660, the MMU control mechanisms transition execution to the detection mechanism. Next, at step 640 the detection mechanisms transition execution to the virtualization assistance layer, passing it the policy decision. Then, at step 645 the virtualization assistance layer transitions execution back to the Separation Kernel Hypervisor, or the Separation Kernel Hypervisor transitions execution from the virtualization assistance layer back to the Separation Kernel Hypervisor. Next, at step 650 the Separation Kernel Hypervisor acts on the policy decision generated by the detection mechanisms (in this example it disallows the attempt to access the page of interest), or the Separation Kernel Hypervisor acts independently of the policy decision, but in a manner that takes the policy decision under advisement (depending on configuration). The SKH may receive, analyze, and/or act upon policy decisions from multiple sources, which may include multiple detection/notification mechanisms; including cases where multiple mechanisms monitor a given Guest OS.

As explained above in connection with FIG. 6A, the Guest Operating System accesses a specified memory location. The memory access may be monitored and identified as including page(s) of interest by the detection mechanism to generate a policy decision. The memory access attempt (either via CPU or DMA) triggers entry into the Separation Kernel Hypervisor.

Turning to FIG. 6B, such system or process may initiate upon entry into the SKH, at 660. Then, at 665, the Separation Kernel Hypervisor securely transitions execution to the Visualization Assistance Layer; in a manner isolated from the Guest Operating System. Next, at 670, the Visualization Assistance Layer transitions execution to the detection mechanisms. The detection mechanisms may then analyze, at 675, the behavior of the Guest Operating System and its resources and makes a policy decision; for example, it may be configured to understand the memory locations which are sensitive (e.g. contain the antivirus code locations), thus decides to deny, pause or continue the malicious memory access attempt. At 676, the detection mechanism(s) may transfer control to a memory management unit (MMU) control mechanism, to execute the instruction and map the appropriate page as inaccessible. Additional details of the MMU functionality, here, are set forth further below in connection with FIG. 10. Then, at 678, the MMU control mechanism(s) may transition execution to the detection mechanism. Once the policy decision(s) have been made and the re-mapping (or unmapping) accomplished, the detection mechanisms transition execution, at 680, to the virtualization assistance layer, passing it the policy decision. Then, at 685, the virtualization assistance layer transitions execution back to the Separation Kernel Hypervisor, or the Separation Kernel Hypervisor transitions execution from the virtualization assistance layer back to the Separation Kernel Hypervisor. Finally, at 690, the Separation Kernel Hypervisor acts on the policy decision generated by the detection mechanisms (in this example it denies the malicious attempt to modify the antivirus code, although it may also allow or pause the memory access), or the Separation Kernel Hypervisor acts independently of the policy decision, but in a manner that takes the policy decision under advisement (depending on configuration). Further, the SKH may receive, analyze, and/or act upon policy decisions from multiple sources, which may include multiple mechanisms; inducing cases where multiple mechanisms monitor a given Guest OS.

FIGS. 7A-7B are representative sequence/flow diagrams illustrating exemplary systems, methods and Separation Kernel Hypervisor architecture consistent with certain aspects related to the innovations herein. FIGS. 7A-7B relate, inter alia, to behavior relating to an attempt to access specified pages of interest such as by the handling of guest operating system instruction sequences (e.g., execution attempts of a repeated pattern/series of MOV, RET, or MOV IRET instruction on an Intel IA32e architecture; such patterns of which may constitute code of "return oriented" attacks/rootkits). Here, in such illustrative cases, memory access within the guest operating system will attempt to corrupt and/or subvert antivirus software and/or software integrity checkers within the guest operating system via a "return oriented" attack (attacks constructed to evade integrity checkers); and the detection mechanisms detects/prevents the attack.

Turning to the illustrative implementations/aspects of FIG. 7A, at step 705, a Guest Operating System receives a command for memory access to a specified memory location. Then at step 710 an attempt to access the pages of interest such as a specific sequence and/or pattern of CPU instructions is performed, that either triggers transition into the SKH for (2a) every instruction in the sequence and/or pattern (a single stepping behavior), or (2b) for a number of instructions of size greater than one of the sequence and/or pattern (multiple stepping). The (2a) or (2b) behavior is based on system configuration. Next, at step 715 the Separation Kernel Hypervisor securely transitions execution to the virtualization assistance layer; in a manner isolated from the Guest Operating System. Then, at step 720 the virtualization assistance layer transitions execution to the detection mechanisms. Next, at step 725 the detection mechanisms analyzes the behavior of the Guest Operating System and its resources and makes a policy decision. Then, at step 750, the detection mechanism 500 transfers control to a memory management unit (MMU) control mechanism 700. This MMU control mechanism 700 performs the memory management unit (MMU) control operations needed to execute the instruction and map the appropriate page as inaccessible. Additional details of the MMU functionality, here, are set forth further below in connection with FIG. 10. Next, at step 755, the MMU control mechanisms transition execution to the detection mechanism. Then, in step 730 the detection mechanisms transition execution to the virtualization assistance layer, passing it the policy decision. Next, in step 735 the virtualization assistance layer transitions execution back to the Separation Kernel Hypervisor, or the Separation Kernel Hypervisor transitions execution from the virtualization assistance layer back to the Separation Kernel Hypervisor. Then, in step 740 the Separation Kernel Hypervisor acts on the policy decision generated by the detection mechanisms (in this example it suspends the Guest OS, preventing the Guest OS from accessing the memory and executing the "Return Oriented" attack; a type of attack that thwarts code integrity checkers in the Guest OS), or the Separation Kernel Hypervisor acts independently of the policy decision, but in a manner that takes the policy decision under advisement (depending on configuration). The SKH may receive, analyze, and/or act upon policy decisions from multiple sources, which may include multiple mechanisms; including cases where multiple mechanisms monitor a given Guest OS. Finally, in step 745, in order to continue to recognize sequences and/or patterns of instructions, execution may cycle a multiple times between steps 705 through 740.

As explained above in connection with FIG. 7A, the guest operating system attempts specific memory access of a page of interest. Here, for example, the page of interest is a specified memory location. The attempt triggers entry into the Separation Kernel Hypervisor.

Turning to FIG. 7B, such illustrative system or process may initiates upon entry into the SKH, at 760. Then, at 765, the Separation Kernel Hypervisor securely transitions execution to the Visualization Assistance Layer; in a manner isolated from the Guest Operating System. Next, at 770, the Visualization Assistance Layer transitions execution to the detection mechanisms. The detection mechanisms may then analyze, at 775, the behavior of the Guest Operating System and its resources and makes a policy decision; in this example it recognizes the Guest Operating System instruction sequence and/or pattern as an attempt to access a page of interest, and the policy decision is to made to deny further (and/or future) execution of the sequence and/or pattern, preventing the Guest Operating System from providing the page of interest to the monitored guest. At 776, the detection mechanism(s) may transfer control to a memory management unit (MMU) control mechanism, to execute the instruction and map the appropriate page as inaccessible. Additional details of the MMU functionality, here, are set forth further below in connection with FIG. 10. Then, at 778, the MMU control mechanism(s) may transition execution to the detection mechanism. Once the policy decision(s) have been made and the re-mapping or unmapping accomplished, the detection mechanism(s) may transition execution, at 780, to the virtualization assistance layer, passing it the policy decision. Then, at 785, the virtualization assistance layer transitions execution back to the Separation Kernel Hypervisor, or the Separation Kernel Hypervisor transitions execution from the virtualization assistance layer back to the Separation Kernel Hypervisor. Optionally, at step 790, the Separation Kernel Hypervisor acts on the policy decision generated by the detection mechanisms (in this example it denies access to the page of interest), or the Separation Kernel Hypervisor acts independently of the policy decision, but in a manner that takes the policy decision under advisement (depending on configuration). Further, the SKH may receive, analyze, and/or act upon policy decisions from multiple sources, which may include multiple mechanisms; inducing cases where multiple mechanisms s monitor a given Guest OS. In a final step 795, in order to recognize sequences and/or patterns of instructions (and/or further monitor an existing monitored sequence and/or pattern of instructions), execution may cycle a multiple times between steps 760 through 790.

Figure 8:
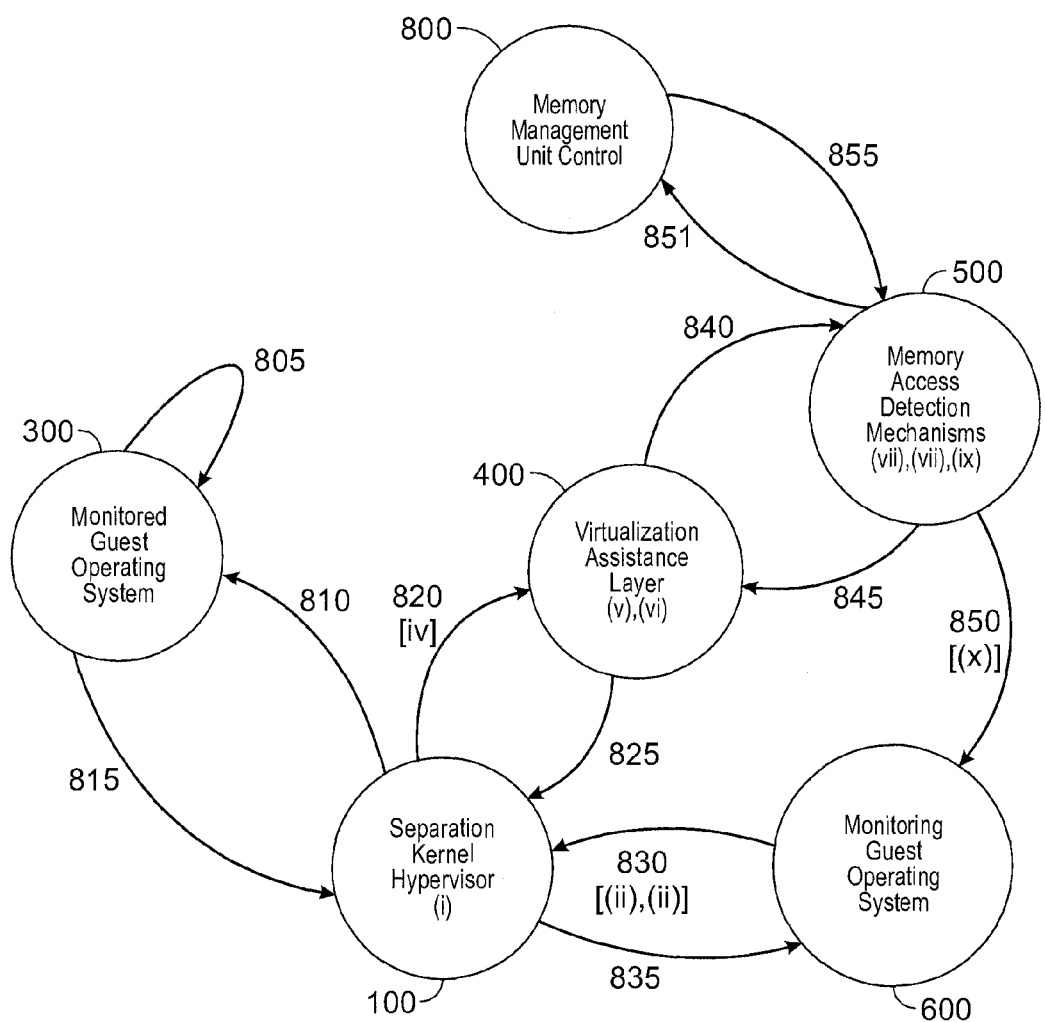
FIG. 8 is a representative sequence diagram illustrating exemplary systems, methods, and Separation Kernel Hypervisor processing/architecture consistent with certain aspects related to the innovations herein.
Figure 9:
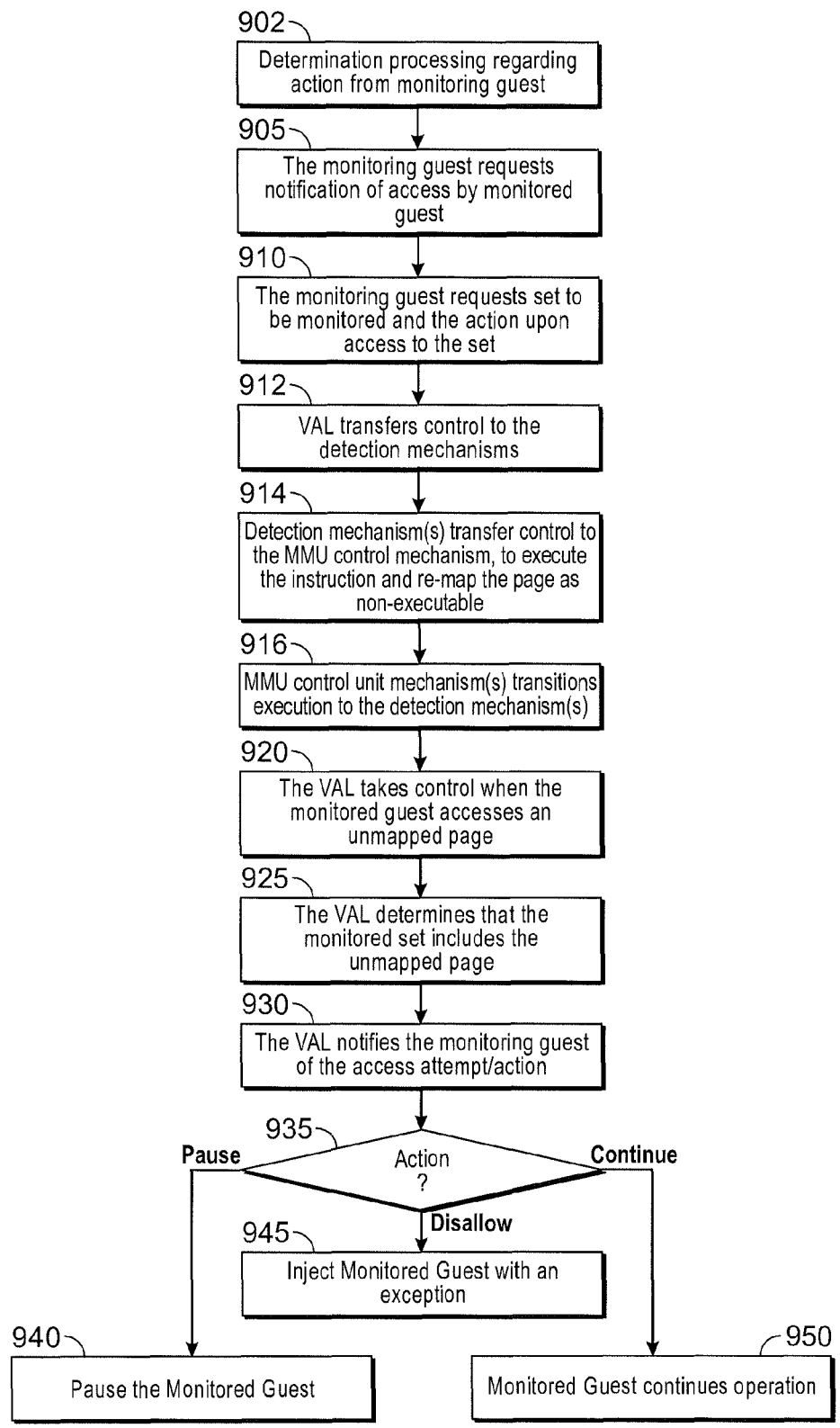
FIG. 9 is a representative flow diagram illustrating exemplary systems, methods, and Separation Kernel Hypervisor processing/architecture consistent with certain aspects related to the innovations herein.

FIGS. 8 and 9 are representative sequence/flow diagrams illustrating exemplary systems, methods, and Separation Kernel Hypervisor processing/architecture consistent with certain aspects related to the innovations herein. FIGS. 8 and 9 relate, inter alia, to the guest operating system attempting to access a specified memory location where the detection mechanisms monitors, detects, and notifies the access and determines an action in response to the detected access.

Turning to the illustrative implementations/aspects of FIG. 8, at step 805, a monitored guest Operating System 300 attempts to access a memory location. Then, at step 815, the request to access the memory location is sent to the SKH. The Separation Kernel Hypervisor 100 ensures the isolation of multiple guest Operating Systems each in its own Virtual Machine (VM) (step i). Another Monitored Guest Operating System 600 allows a suitably authorized Monitoring Guest 600 to send 830 a list of memory locations to be monitored for another guest 300 (step ii). Furthermore, a suitably authorized guest 600 can send a message to another guest 300 (step iii).

A response from the SKH 100 is provided to the Monitored Guest Operating System 600 at step 600. Next, at step 820 the Separation Kernel Hypervisor securely transitions execution to the virtualization assistance layer 400 in a manner isolated from the Guest Operating System. The Virtualization Assistance Layer (VAL 400) is software that runs within the same protection domain as the guest Virtual Machine but is not directly accessible by the guest (step iv). The Virtualization Assistance Layer 400 implements a virtual motherboard containing a virtual CPU and memory (step v). The VAL 400 also implements a mechanism to unmap specified pages on demand from another guest (step vi). Then, at 840, the virtualization assistance layer transitions execution to the Memory Access Detection Mechanisms 500. Next, the detection mechanisms analyze the behavior of the Guest Operating System and its resources and makes a policy decision. The VAL 400 and mechanism 500 processes unmapped page exceptions taken by its associated guest virtual machine. Here also, for example, at 851, the detection mechanism 500 may transfer control to a memory management unit (MMU) control mechanism 800. This MMU control mechanism 800 performs memory management unit (MMU) control operations needed to execute the instruction and map the appropriate page as inaccessible. Additional details of the MMU functionality, here, are set forth further below in connection with FIG. 10. Next, at step 855, the MMU control mechanisms transition execution to the detection mechanism. With respect to the policy decisions made by VAL 400 and mechanism 500, these may include pausing the execution of its associated guest virtual machine, injecting a page-not-found exception into its associated guest virtual machine, or allowing the access to the page to continue. Then, at 845 the detection mechanisms transition execution to the virtualization assistance layer, passing to it the policy decision. Next, at step 825 the virtualization assistance layer transitions execution back to the Separation Kernel Hypervisor, or the Separation Kernel Hypervisor transitions execution from the virtualization assistance layer back to the Separation Kernel Hypervisor. At step 810, the SKH 100 transitions execution to the Monitored Guest Operating System 300 based on the policy decision. At step 825, the Separation Kernel Hypervisor acts on the policy decision generated by the detection mechanisms, or the Separation Kernel Hypervisor acts independently of the policy decision, but in a manner that takes the policy decision under advisement (depending on configuration). The SKH may receive, analyze, and/or act upon policy decisions from multiple sources, which may include multiple mechanisms; including cases where multiple mechansisms monitor a given Guest OS. At step 850, the mechanism 400 sends a notification of the memory access and associated context information to the requesting guest OS 600. Then, in order to continue to recognize sequences and/or patterns of memory access, execution may cycle a multiple times between steps 805 through 850.

As explained above in connection with FIG. 8, the Guest Operating System attempts to access memory. The attempt triggers entry into the Separation Kernel Hypervisor for monitoring and/or detection and/or notification.

Turning to FIG. 9, such illustrative system or process begins where a hypervisor is configured to allow a guest (monitoring guest) to request notifications of access by another guest (monitored guest). Here, the monitoring guest may request, at 905, that a set of physical pages be monitored, and the action (e.g., pause, disallow, or continue) to be taken on such access. The VAL in the monitored guest maps those physical pages as inaccessible, at 910. This is distinct from the monitored guest's notion of page mappings. At 912, the detection mechanism(s) may transfer control to a memory management unit (MMU) control mechanism, to execute the instruction and map the appropriate page as non-executable. Additional details of the MMU functionality, here, are set forth further below in connection with FIG. 10. Then, at 914, the MMU control mechanism(s) may transition execution to the detection mechanism. Next, the VAL of the monitored guest maps, at 915, the set as inaccessible. At 920, when software in the monitored guest accesses an unmapped page, control transitions to the VAL. The VAL determines that the unmapped page is part of the set to be monitored, at step 925. The VAL notifies the monitoring guest of the access action, at 930. The action may be determined and/or processed, at 935, based on the action set by the monitoring guest. If the action is pause, at 940, the monitored guest is paused. If the action is disallow, at 945, the monitored guest is injected with an exception, as though the page did not exist. If the action is continue, at 950, the monitored guest is allowed to continue operation as though the page had always been mapped in.

Figure 10:
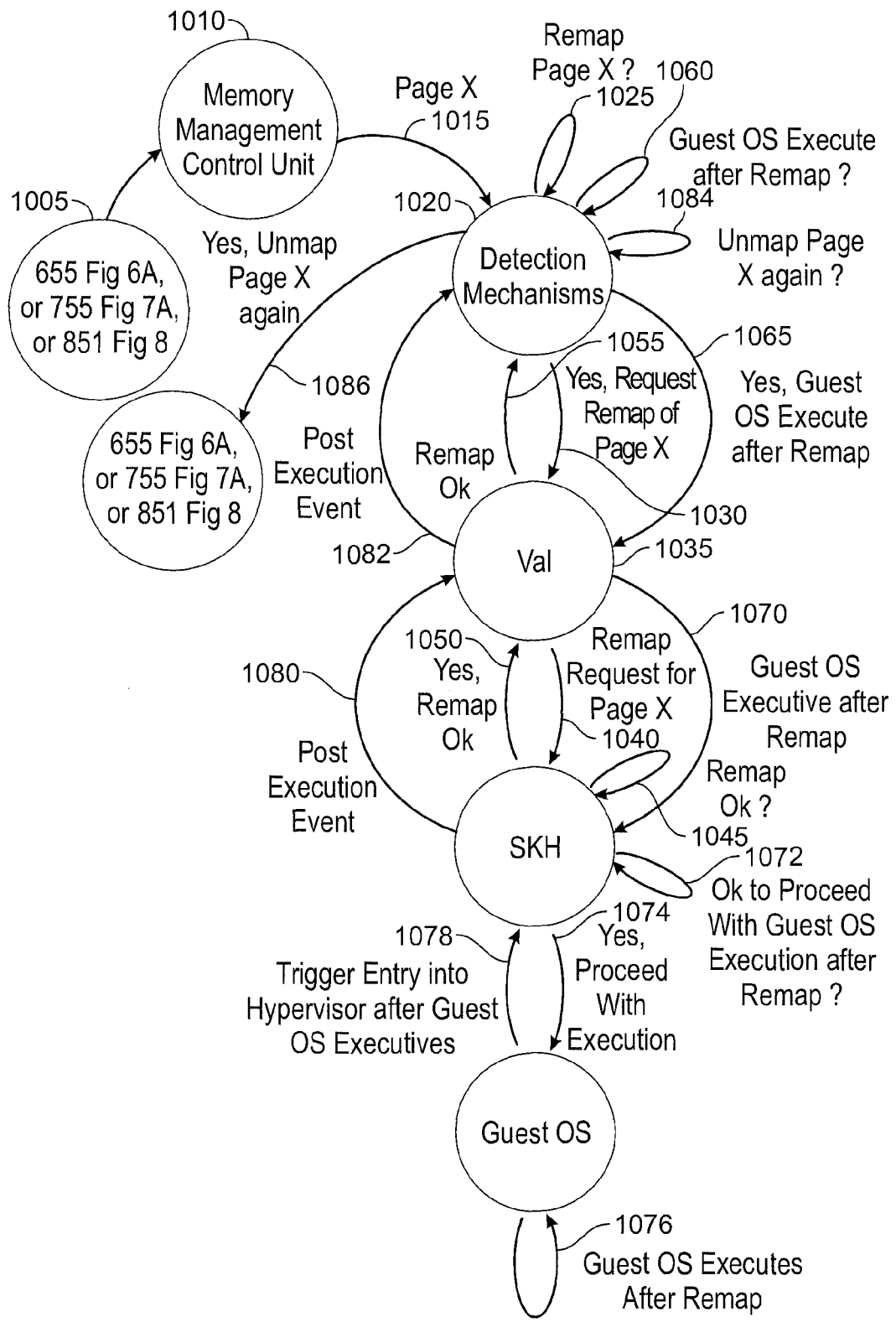
FIG. 10 is an exemplary state diagram illustrating aspects of memory management unit processing in conjunction with the hypervisor and VAL, consistent with certain aspects related to the innovations herein.

FIG. 10 is an exemplary state diagram illustrating aspects of memory management unit processing in conjunction with the hypervisor and VAL, consistent with certain aspects related to the innovations herein. In FIG. 10, control is passed to the Memory Management Unit (MMU) Control 1019 via any of the following control paths 1005 including step 655 (from FIG. 6A), step 755 (from FIG. 7A), and step 851 (from FIG. 8). Step 1015 transitions control from the Memory Management Control Unit 1010 to the detection mechanisms 1020 to make a policy decision regarding the page of memory the GuestOS had attempted to access. The detection mechanisms 1020 execute a policy decision to either deny or allow the GuestOS to access the memory. In step 1025, the detection mechanisms 1020 execute the decision to allow the GuestOS access to the memory.

The detection mechanisms may transition execution to the VAL 1035 with a request that the page of memory the GuestOS had attempted to access be remapped (mapped as accessible) to the GuestOS at step 1030.

The VAL may then transition execution to the SKH with a request that the page of memory the GuestOS had attempted to access be remapped (mapped as accessible) to the GuestOS at step 1040. The SKH executes a policy decision at step 1045 to allow or deny the request that the page of memory the GuestOS had attempted to access be remapped (mapped as accessible) to the GuestOS. In an exemplary embodiment, the SKH allows the request to map the memory page as accessible to the GuestOS.

The SKH may transition execution back to the VAL at step 1050 with a message that the memory page that the GuestOS had attempted to access has been remapped (mapped as accessible) to the GuestOS. The VAL transitions execution back to the detection mechanisms 1020 at step 1055 with a message that the memory page that the GuestOS had attempted to access has been remapped (mapped as accessible) to the GuestOS.

At step 1060, the detection mechanisms 1020 execute a policy decision to either allow or deny the GuestOS to complete the execution of the command/instruction that the GuestOS had attempted which had triggered the GuestOS access attempt to the memory page.

At step 1065, the detection mechanisms 1020 determine to allow the GuestOS to complete execution of the command/instruction that the GuestOS had attempted which had triggered the GuestOS access attempt to the memory page. The detection mechanisms then transition execution to the VAL 1035.

At step 1070, the VAL 1035 then transitions execution to the SKH with a request to allow the GuestOS to complete execution command/instruction that the GuestOS had attempted which had triggered the GuestOS access attempt to the memory page. The SKH executes a policy decision at step 1072 to allow or deny the GuestOS to complete execution of the command/instruction that the GuestOS had attempted which had triggered the GuestOS access attempt to the memory page. In this example, the SKH allows the GuestOS to complete the execution of that command/instruction. At step 1074, the SKH securely transition execution to the GuestOS. At step 1076, the GuestOS completes execution of the command/instruction that the GuestOS had attempted which triggered the GuestOS access attempt to the memory page. At step 1078, the protection mechanisms provided by the SKH trigger a transition back to the SKH immediately after completion of the GuestOS command/instruction.

At step 1080, the SKH transitions execution back to the VAL 1035, with a message that the GuestOS has completed execution of the command/instruction that the GuestOS had attempted which had triggered the GuestOS access attempt to the memory page. At step 1082, the VAL 1035 transitions execution to the detection mechanisms 1020 with a message that the GuestOS has completed execution of the command/instruction that the GuestOS had attempted which had triggered the GuestOS access attempt to the memory page. At step 1084, the detection mechanisms 1020 determine whether the memory page is unmapped again. At step 1086, the detection mechanisms 1020 make a transition back to the VAL via any of the control paths including step 600 (from FIG. 6A), step 750 (from FIG. 7A), and step 855 (from FIG. 8).

At a high level, as may apply to the above examples, the actions taken on monitored activity may include policy based actions taken by, and/or coordinated between, the Separation Kernel Hypervisor 100, virtualization assistance layer 400, and/or detection mechanisms 500. Such actions may include, but are not limited to any of the following: (1) preventing the monitored activity; (2) allowing the monitored activity; (3) allowing the monitored activity, with instrumentation, and/or partial blocking. It may be that certain sub-sets of the activity are permissible (by configuration policy), and that a portion of the activity may be allowed and a portion blocked and/or substituted with a harmless surrogate; such as insertion of no-ops in malicious code to render malicious code inert. This may include run-time patching of CPU state of a guest operating system 300, and/or any resources of the guest operating system 300; (4) reporting on the monitored activity, possibly exporting reports to other software in the system, or on remote systems; and/or (5) replay of the monitored activity.

With regard to (5), in separation kernel hypervisor 100 configurations supporting rewind of guest operating system 300 state, the state of the guest operating system 300 can be rewound and the monitored activity can be replayed and re-monitored (to a degree); e.g., if the detection mechanisms 500 requires more systems resources, and/or to map more context of the guest operating system 300, the detection mechanisms 500 may request a rewind, request more resources, then request the replay of the monitored activity; so that the detection mechanisms 500 may perform analysis of the monitored activity with the advantage of more resources. Systems and methods of monitoring activity, as may be utilized by the separation kernel hypervisor 100, virtualization assistance layer 400, and/or detection mechanisms 500; for activities which may include guest operating system 300 activities, and/or Separation Kernel Hypervisor 100, virtualization assistance layer 4000, and/or detection mechanisms 500 activities (such as feedback between such components), including those activities which may cause transition to the separation kernel hypervisor 100, virtualization assistance layer 400, and/or detection mechanisms 500 include (but are not limited to): synchronous, bound to a specific instruction stream and/or sequence within a processor, CPU, or platform device and/or ABI, certain elements of which can be used to trap and/or transition to/from the hypervisor. For example, instructions which induce trapping. Such events may be generated by the Separation Kernel Hypervisor 100, virtualization assistance layer 400, and/or detection mechanisms 500.

The innovations and mechanisms herein may also provide or enable means by which software and/or guest operating system vulnerabilities, including improper use of CPU interfaces, specifications, and/or ABIs may be detected and/or prevented; including cases where software vendors have implemented emulation and/or virtualization mechanisms improperly.

Implementations and Other Nuances

The innovations herein may be implemented via one or more components, systems, servers, appliances, other sub-components, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, appliances, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and other non-transitory media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Other non-transitory media may comprise computer readable instructions, data structures, program modules or other data embodying the functionality herein, in various non-transitory formats. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer, to processing/graphics hardware, and the like. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., Silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), though do not include transitory media such as carrier waves.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the inventions have been specifically described herein, it will be apparent to those skilled in the art to which the inventions pertain that variations and modifications of the various implementations shown and described herein may be made without departing from the spirit and scope of the inventions. Accordingly, it is intended that the inventions be limited only to the extent required by the applicable rules of law.

The invention claimed is:

1. A method for processing information securely, the method comprising:
   partitioning hardware platform resources via a separation kernel hypervisor into a plurality of guest operating system virtual machine protection domains;
   providing a dedicated virtualization assistance layer (dedicated VAL) including a virtual representation of the hardware platform that is a virtual machine in each of the guest operating system virtual machine protection domains such that the dedicated VAL security processing is not performed in the separation kernel hypervisor;
   processing the virtual machine via another guest;
   hosting at least one detection mechanism that executes within the virtual hardware platform in each of the plurality of guest operating system virtual machine protection domains via the separation kernel hypervisor;

upon detection of suspect behavior, securely transition execution to the detection mechanism within the dedicated VAL in a manner isolated from the guest operating system;

securely determining, via the detection mechanism, a policy decision regarding the suspect behavior, wherein the securely determining comprises:

analyzing of the guest operating system and the guest operating system resources' behavior; and processing unmapped page exceptions taken by the guest operating system based on the unmapped pages; and transitioning execution back to the separation kernel hypervisor to continue processing regarding enforcement of or taking action in connection with the policy decision;

the method further comprising one or more of:

hosting an unmapping mechanism to unmap specified pages on demand from the another guest;

receiving, via the unmapping mechanism, the demand to unmap the specified pages; and unmapping, via the unmapping mechanism, the specified pages.

2. The method of claim 1 further comprising one or more of:

hosting a mechanism to unmap specified pages on demand from the another guest;

processing an unmapped page exception taken by the virtual machine;

pausing an execution of the virtual machine;

injecting a page-not-found exception into the virtual machine; and sending a notification of memory access and associated context information to a requesting guest, wherein the virtual machine comprises a virtual motherboard including a virtual CPU and memory by the VAL.

3. The method of claim 1, further comprising:

hosting a remapping mechanism to remap unmapped pages;

upon securely determining, via the detection mechanism, the policy decision, transitioning execution to the remapping mechanism;

remapping, via the remapping mechanism, the unmapped pages as inaccessible; and transitioning, via the remapping mechanism, execution to the detection mechanism.

4. The method of claim 1, further comprising:

isolating the domains in time and space from each other.

5. The method of claim 1 further comprising one or more of:

hosting the at least one detection mechanism, each which may be different from each other, that executes within one or more of the plurality of guest operating system virtual machine protection domains via the separation kernel hypervisor;

implementing at least one routine and/or component to prohibit the guest operating system virtual machine protection domains from tampering with, corrupting, and/or bypassing the at least one detection mechanism; and/or executing the at least one detection mechanism while preventing interference, bypassing, corrupting and/or tampering by the plurality of guest operating system virtual machine protection domains;

hosting a mechanism to process a page of the virtual machine of a first guest by a second guest; and sending a notification associated with the virtual machine of the first guest to the second guest.

6. The method of claim 5 further comprising:

hosting an unmapping mechanism to unmap a page of interest; and unmapping, via the unmapping mechanism, the page of interest.

7. The method of claim 6 further comprising:

hosting a remapping mechanism to remap unmapped pages;

transitioning execution to the remapping mechanism;

remapping, via the remapping mechanism, the unmapped pages as inaccessible; and transitioning, via the remapping mechanism; execution to the detection mechanism.

8. The method of claim 1, further comprising:

implementing a separation kernel hypervisor that ensures isolation of multiple guest operating systems, each guest operating system in its own virtual machine.

9. The method of claim 1, further comprising:

implementing a separation kernel hypervisor that implements a mechanism whereby a suitably authorized guest can send a list of memory locations to be watched to another guest.

10. The method of claim 1, further comprising:

implementing a separation kernel hypervisor that implements a mechanism whereby a suitably authorized guest can send a message to another guest.

11. The method of claim 1 further comprising:

implementing the dedicated VAL via software that runs within the same protection domain as the guest virtual machine but is not directly accessible by the guest.

12. The method of claim 1, further comprising:

implementing the dedicated VAL such that the dedicated VAL implements a virtual motherboard containing a virtual CPU and memory.

13. The method of claim 1 further comprising:

implementing the dedicated VAL such that the dedicated VAL implements a mechanism to unmap specified pages on demand from another guest.

14. The method of claim 1, further comprising:

implementing the dedicated VAL such that the dedicated VAL processes unmapped page exceptions taken by its associated guest virtual machine.

15. The method of claim 1, further comprising:

implementing the dedicated VAL such that the dedicated VAL is configured to pause the execution of its associated guest virtual machine.

16. The method of claim 1, further comprising:

implementing the dedicated VAL such that the dedicated VAL is configured to inject a page-not-found exception into its associated guest virtual machine.

17. The method of claim 1, further comprising:

implementing the dedicated VAL such that the dedicated VAL is configured to send a notification of the memory access and associated context information to the requesting guest.

18. The method of claim 1 further comprising one or more of:

hosting a mechanism to unmap specified pages on demand from another guest; processing an unmapped page exception taken by the virtual machine;

mapping the previously unmapped page;

sending a notification of memory access and associated context information to a requesting guest, wherein the virtual machine comprises a virtual motherboard including a virtual CPU and memory by the VAL;
allowing the virtual machine to execute a single instruction;
returning control to the VAL;
mapping the page as non-existent again; and/or
returning control to the virtual machine.

19. The method of claim 18 further comprising:
configuring a memory management unit such that software in the virtual machine cannot undo the mapping.

20. The method of claim 19 wherein the mapping that cannot be undone comprises remapping or unmapping.

21. The method of claim 19 wherein the mapping that cannot be undone comprises remapping and unmapping.

22. The method of claim 1 further comprising:
hosting a mechanism to unmap specified pages on demand from the another guest;
processing an unmapped page exception taken by the virtual machine;
pausing an execution of the virtual machine;
injecting a page-not-found exception into the virtual machine; and
sending a notification of memory access and associated context information to a requesting guest, wherein the virtual machine comprises a virtual motherboard including a virtual CPU and memory by the VAL.

23. The method of claim 1 further comprising:
hosting the at least one detection mechanism, each which may be different from each other, that executes within one or more of the plurality of guest operating system virtual machine protection domains via the separation kernel hypervisor; and
implementing at least one routine and/or component to prohibit the guest operating system virtual machine protection domains from tampering with, corrupting, and/or bypassing the at least one detection mechanism.

24. The method of claim 1 further comprising:
hosting the at least one detection mechanism, each which may be different from each other, that executes within one or more of the plurality of guest operating system virtual machine protection domains via the separation kernel hypervisor; and
executing the at least one detection mechanism while preventing interference, bypassing, corrupting and/or tampering by the plurality of guest operating system virtual machine protection domains.

25. The method of claim 1 further comprising:
hosting an unmapping mechanism to unmap a page of interest; and
unmapping, via the unmapping mechanism, the page of interest.

26. The method of claim 25 further comprising:
hosting a remapping mechanism to remap unmapped pages;
transitioning execution to the remapping mechanism;
remapping, via the remapping mechanism, the unmapped pages as inaccessible; and
transitioning, via the remapping mechanism; execution to the detection mechanism.

27. The method of claim 1 further comprising:
hosting a mechanism to unmap specified pages on demand from another guest; processing an unmapped page exception taken by the virtual machine;
mapping the previously unmapped page;
sending a notification of memory access and associated context information to a requesting guest, wherein the virtual machine comprises a virtual motherboard including a virtual CPU and memory by the VAL;
allowing the virtual machine to execute a single instruction;
returning control to the VAL;
mapping the page as non-existent again; and
returning control to the virtual machine.

28. The method of claim 27 further comprising:
configuring a memory management unit such that software in the virtual machine cannot undo the mapping.

29. The method of claim 28 wherein the mapping that cannot be undone comprises remapping or unmapping.

30. The method of claim 28 wherein the mapping that cannot be undone comprises remapping and unmapping.

31. A method for processing information securely, the method comprising:
partitioning hardware platform resources via a separation kernel hypervisor into a plurality of guest operating system virtual machine protection domains;
isolating the domains in time and space from each other;
providing a list of memory locations of an authorized guest to another guest;
providing a message of the authorized guest to the another guest;
providing a virtualization assistance layer (VAL) including a virtual representation of the hardware platform in each of the guest operating system virtual machine protection domains such that the VAL is not directly accessible by the authorized guest, wherein the virtual representation of the hardware platform is a virtual machine comprising a virtual motherboard including a virtual CPU and memory by the VAL;
hosting a mechanism to unmap specified pages on demand from the another guest;
processing an unmapped page exception taken by the virtual machine;
pausing an execution of the virtual machine;
injecting a page-not-found exception into the virtual machine; and
sending a notification of memory access and associated context information to a requesting guest.

32. The method of claim 31 further comprising one or more of:
hosting a mechanism to unmap specified pages on demand from the another guest;
processing an unmapped page exception taken by the virtual machine;
pausing an execution of the virtual machine;
injecting a page-not-found exception into the virtual machine; and
sending a notification of memory access and associated context information to a requesting guest, wherein the virtual machine comprises a virtual motherboard including a virtual CPU and memory by the VAL.

33. The method of claim 31, further comprising:
hosting an unmapping mechanism to unmap specified pages on demand from the another guest;
receiving, via the unmapping mechanism, the demand to unmap the specified pages; and
unmapping, via the unmapping mechanism, the specified pages.

34. The method of claim 31, further comprising:
hosting a remapping mechanism to remap unmapped pages;
upon securely determining, via the detection mechanism, the policy decision, transitioning execution to the remapping mechanism;

remapping, via the remapping mechanism, the unmapped pages as inaccessible; and transitioning, via the remapping mechanism, execution to the detection mechanism.

35. The method of claim 31 further comprising one or more of:

hosting the at least one detection mechanism, each which may be different from each other, that executes within one or more of the plurality of guest operating system virtual machine protection domains via the separation kernel hypervisor;

implementing at least one routine and/or component to prohibit the guest operating system virtual machine protection domains from tampering with, corrupting, and/or bypassing the at least one detection mechanism; and/or executing the at least one detection mechanism while preventing interference, bypassing, corrupting and/or tampering by the plurality of guest operating system virtual machine protection domains;

hosting a mechanism to process a page of the virtual machine of a first guest by a second guest; and sending a notification associated with the virtual machine of the first guest to the second guest.

36. The method of claim 35 further comprising:

hosting an unmapping mechanism to unmap a page of interest; and unmapping, via the unmapping mechanism, the page of interest.

37. The method of claim 36 further comprising:

hosting a remapping mechanism to remap unmapped pages;

transitioning execution to the remapping mechanism;

remapping, via the remapping mechanism, the unmapped pages as inaccessible; and transitioning, via the remapping mechanism; execution to the detection mechanism.

38. The method of claim 31, further comprising:

implementing a separation kernel hypervisor that ensures isolation of multiple guest operating systems, each guest operating system in its own virtual machine.

39. The method of claim 31, further comprising:

implementing a separation kernel hypervisor that implements a mechanism whereby a suitably authorized guest can send a list of memory locations to be watched to another guest.

40. The method of claim 31, further comprising:

implementing a separation kernel hypervisor that implements a mechanism whereby a suitably authorized guest can send a message to another guest.

41. The method of claim 31 further comprising:

implementing the dedicated VAL via software that runs within the same protection domain as the guest virtual machine but is not directly accessible by the guest.

42. The method of claim 31, further comprising:

implementing the dedicated VAL such that the dedicated VAL implements a virtual motherboard containing a virtual CPU and memory.

43. The method of claim 31 further comprising:

implementing the dedicated VAL such that the dedicated VAL implements a mechanism to unmap specified pages on demand from another guest.

44. The method of claim 31 further comprising:

implementing the dedicated VAL such that the dedicated VAL processes unmapped page exceptions taken by its associated guest virtual machine.

45. The method of claim 31, further comprising:

implementing the dedicated VAL such that the dedicated VAL is configured to pause the execution of its associated guest virtual machine.

46. The method of claim 31, further comprising:

implementing the dedicated VAL such that the dedicated VAL is configured to inject a page-not-found exception into its associated guest virtual machine.

47. The method of claim 31, further comprising:

implementing the dedicated VAL such that the dedicated VAL is configured to send a notification of the memory access and associated context information to the requesting guest.

48. The method of claim 31 further comprising one or more of:

hosting a mechanism to unmap specified pages on demand from another guest; processing an unmapped page exception taken by the virtual machine;

mapping the previously unmapped page;

sending a notification of memory access and associated context information to a requesting guest, wherein the virtual machine comprises a virtual motherboard including a virtual CPU and memory by the VAL;

allowing the virtual machine to execute a single instruction;

returning control to the VAL;

mapping the page as non-existent again; and/or returning control to the virtual machine.

49. The method of claim 48 further comprising:

configuring a memory management unit such that software in the virtual machine cannot undo the mapping.

50. The method of claim 49 wherein the mapping that cannot be undone comprises remapping or unmapping.

51. The method of claim 49 wherein the mapping that cannot be undone comprises remapping and unmapping.

52. The method of claim 31 further comprising:

hosting a mechanism to unmap specified pages on demand from the another guest;

processing an unmapped page exception taken by the virtual machine;

pausing an execution of the virtual machine;

injecting a page-not-found exception into the virtual machine; and sending a notification of memory access and associated context information to a requesting guest, wherein the virtual machine comprises a virtual motherboard including a virtual CPU and memory by the VAL.

53. The method of claim 31 further comprising:

hosting the at least one detection mechanism, each which may be different from each other, that executes within one or more of the plurality of guest operating system virtual machine protection domains via the separation kernel hypervisor; and implementing at least one routine and/or component to prohibit the guest operating system virtual machine protection domains from tampering with, corrupting, and/or bypassing the at least one detection mechanism.

54. The method of claim 31 further comprising:

hosting the at least one detection mechanism, each which may be different from each other, that executes within one or more of the plurality of guest operating system virtual machine protection domains via the separation kernel hypervisor; and executing the at least one detection mechanism while preventing interference, bypassing, corrupting and/or tampering by the plurality of guest operating system virtual machine protection domains.

55. The method of claim 31 further comprising:
hosting an unmapping mechanism to unmap a page of interest; and
unmapping, via the unmapping mechanism, the page of interest.

56. The method of claim 55 further comprising:
hosting a remapping mechanism to remap unmapped pages;
transitioning execution to the remapping mechanism;
remapping, via the remapping mechanism, the unmapped pages as inaccessible; and
transitioning, via the remapping mechanism; execution to the detection mechanism.

57. The method of claim 31 further comprising:
hosting a mechanism to unmap specified pages on demand from another guest; processing an unmapped page exception taken by the virtual machine;
mapping the previously unmapped page;
sending a notification of memory access and associated context information to a requesting guest, wherein the virtual machine comprises a virtual motherboard including a virtual CPU and memory by the VAL;
allowing the virtual machine to execute a single instruction;
returning control to the VAL;
mapping the page as non-existent again; and
returning control to the virtual machine.

58. The method of claim 57 further comprising:
configuring a memory management unit such that software in the virtual machine cannot undo the mapping.

59. The method of claim 58 wherein the mapping that cannot be undone comprises remapping or unmapping.

60. The method of claim 58 wherein the mapping that cannot be undone comprises remapping and unmapping.

61. A method for processing information securely, the method comprising:
partitioning hardware platform resources via a separation kernel hypervisor into a plurality of guest operating system virtual machine protection domains;
providing a dedicated virtualization assistance layer (dedicated VAL) including a virtual representation of the hardware platform that is a virtual machine in each of the guest operating system virtual machine protection domains such that the dedicated VAL security processing is not performed in the separation kernel hypervisor;
processing the virtual machine via another guest;
hosting at least one detection mechanism that executes within the virtual hardware platform in each of the plurality of guest operating system virtual machine protection domains via the separation kernel hypervisor;
upon detection of suspect behavior, securely transition execution to the detection mechanism within the dedicated VAL in a manner isolated from the guest operating system;
securely determining, via the detection mechanism, a policy decision regarding the suspect behavior, wherein the securely determining comprises:
analyzing the guest operating system and the guest operating system resources' behavior; and
processing unmapped page exceptions taken by the guest operating system based on the unmapped pages; and
transitioning execution back to the separation kernel hypervisor to continue processing regarding enforcement of or taking action in connection with the policy decision;
the method further comprising:
hosting an unmapping mechanism to unmap specified pages on demand from the another guest; and
unmapping, via the unmapping mechanism, the specified pages.

62. The method of claim 61 further comprising one or more of:
hosting a mechanism to unmap specified pages on demand from the another guest;
processing an unmapped page exception taken by the virtual machine;
pausing an execution of the virtual machine;
injecting a page-not-found exception into the virtual machine; and
sending a notification of memory access and associated context information to a requesting guest, wherein the virtual machine comprises a virtual motherboard including a virtual CPU and memory by the VAL.

63. The method of claim 61, further comprising:
hosting an unmapping mechanism to unmap specified pages on demand from the another guest;
receiving, via the unmapping mechanism, the demand to unmap the specified pages; and
unmapping, via the unmapping mechanism, the specified pages.

64. The method of claim 61, further comprising:
hosting a remapping mechanism to remap unmapped pages;
upon securely determining, via the detection mechanism, the policy decision, transitioning execution to the remapping mechanism;
remapping, via the remapping mechanism, the unmapped pages as inaccessible; and
transitioning, via the remapping mechanism, execution to the detection mechanism.

65. The method of claim 61 further comprising one or more of:
hosting the at least one detection mechanism, each which may be different from each other, that executes within one or more of the plurality of guest operating system virtual machine protection domains via the separation kernel hypervisor;
implementing at least one routine and/or component to prohibit the guest operating system virtual machine protection domains from tampering with, corrupting, and/or bypassing the at least one detection mechanism; and/or
executing the at least one detection mechanism while preventing interference, bypassing, corrupting and/or tampering by the plurality of guest operating system virtual machine protection domains;
hosting a mechanism to process a page of the virtual machine of a first guest by a second guest; and
sending a notification associated with the virtual machine of the first guest to the second guest.

66. The method of claim 65 further comprising:
hosting an unmapping mechanism to unmap a page of interest; and
unmapping, via the unmapping mechanism, the page of interest.

67. The method of claim 66 further comprising:
hosting a remapping mechanism to remap unmapped pages;
transitioning execution to the remapping mechanism;
remapping, via the remapping mechanism, the unmapped pages as inaccessible; and
transitioning, via the remapping mechanism; execution to the detection mechanism.

68. The method of claim 61, further comprising:
implementing a separation kernel hypervisor that ensures isolation of multiple guest operating systems, each guest operating system in its own virtual machine.

69. The method of claim 61, further comprising:
implementing a separation kernel hypervisor that implements a mechanism whereby a suitably authorized guest can send a list of memory locations to be watched to another guest.

70. The method of claim 61, further comprising:
implementing a separation kernel hypervisor that implements a mechanism whereby a suitably authorized guest can send a message to another guest.

71. The method of claim 61 further comprising:
implementing the dedicated VAL via software that runs within the same protection domain as the guest virtual machine but is not directly accessible by the guest.

72. The method of claim 61, further comprising:
implementing the dedicated VAL such that the dedicated VAL implements a virtual motherboard containing a virtual CPU and memory.

73. The method of claim 61 further comprising:
implementing the dedicated VAL such that the dedicated VAL implements a mechanism to unmap specified pages on demand from another guest.

74. The method of claim 61, further comprising:
implementing the dedicated VAL such that the dedicated VAL processes unmapped page exceptions taken by its associated guest virtual machine.

75. The method of claim 61, further comprising:
implementing the dedicated VAL such that the dedicated VAL is configured to pause the execution of its associated guest virtual machine.

76. The method of claim 61, further comprising:
implementing the dedicated VAL such that the dedicated VAL is configured to inject a page-not-found exception into its associated guest virtual machine.

77. The method of claim 61, further comprising:
implementing the dedicated VAL such that the dedicated VAL is configured to send a notification of the memory access and associated context information to the requesting guest.

78. The method of claim 61 further comprising one or more of:
hosting a mechanism to unmap specified pages on demand from another guest; processing an unmapped page exception taken by the virtual machine;
mapping the previously unmapped page;
sending a notification of memory access and associated context information to a requesting guest, wherein the virtual machine comprises a virtual motherboard including a virtual CPU and memory by the VAL;
allowing the virtual machine to execute a single instruction;
returning control to the VAL;
mapping the page as non-existent again; and/or
returning control to the virtual machine.

79. The method of claim 78 further comprising:
configuring a memory management unit such that software in the virtual machine cannot undo the mapping.

80. The method of claim 79 wherein the mapping that cannot be undone comprises remapping or unmapping.

81. The method of claim 79 wherein the mapping that cannot be undone comprises remapping and unmapping.

82. The method of claim 61 further comprising:
hosting a mechanism to unmap specified pages on demand from the another guest;
processing an unmapped page exception taken by the virtual machine;
pausing an execution of the virtual machine;
injecting a page-not-found exception into the virtual machine; and
sending a notification of memory access and associated context information to a requesting guest, wherein the virtual machine comprises a virtual motherboard including a virtual CPU and memory by the VAL.

83. The method of claim 61 further comprising:
hosting the at least one detection mechanism, each which may be different from each other, that executes within one or more of the plurality of guest operating system virtual machine protection domains via the separation kernel hypervisor; and
implementing at least one routine and/or component to prohibit the guest operating system virtual machine protection domains from tampering with, corrupting, and/or bypassing the at least one detection mechanism.

84. The method of claim 61 further comprising:
hosting the at least one detection mechanism, each which may be different from each other, that executes within one or more of the plurality of guest operating system virtual machine protection domains via the separation kernel hypervisor; and
executing the at least one detection mechanism while preventing interference, bypassing, corrupting and/or tampering by the plurality of guest operating system virtual machine protection domains.

85. The method of claim 61 further comprising:
hosting an unmapping mechanism to unmap a page of interest; and
unmapping, via the unmapping mechanism, the page of interest.

86. The method of claim 85 further comprising:
hosting a remapping mechanism to remap unmapped pages;
transitioning execution to the remapping mechanism;
remapping, via the remapping mechanism, the unmapped pages as inaccessible; and
transitioning, via the remapping mechanism; execution to the detection mechanism.

87. The method of claim 61 further comprising:
hosting a mechanism to unmap specified pages on demand from another guest; processing an unmapped page exception taken by the virtual machine;
mapping the previously unmapped page;
sending a notification of memory access and associated context information to a requesting guest, wherein the virtual machine comprises a virtual motherboard including a virtual CPU and memory by the VAL;
allowing the virtual machine to execute a single instruction;
returning control to the VAL;
mapping the page as non-existent again; and
returning control to the virtual machine.

88. The method of claim 87 further comprising:
configuring a memory management unit such that software in the virtual machine cannot undo the mapping.

89. The method of claim 88 wherein the mapping that cannot be undone comprises remapping or unmapping.

90. The method of claim 88 wherein the mapping that cannot be undone comprises remapping and unmapping.

* * * * *